(12) United States Patent
Yook et al.

(10) Patent No.: US 8,060,588 B2
(45) Date of Patent: Nov. 15, 2011

(54) HOME NETWORK APPARATUS AND SYSTEM FOR COOPERATIVE WORK SERVICE AND METHOD THEREOF

(75) Inventors: Hyun-gyoo Yook, Seoul (KR); Hyun-sik Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1839 days.

(21) Appl. No.: 10/823,646

(22) Filed: Apr. 14, 2004

(65) Prior Publication Data

US 2005/0021714 A1   Jan. 27, 2005

(30) Foreign Application Priority Data

Apr. 17, 2003 (KR) .................. 10-2003-0024504

(51) Int. Cl.
*G06F 15/173* (2006.01)
(52) U.S. Cl. .............. 709/223; 709/205; 709/220
(58) Field of Classification Search .......... 709/205, 709/223–224, 229, 217, 220
See application file for complete search history.

(56) References Cited

U.S. PATENT DOCUMENTS

| | | | |
|---|---|---|---|
| 6,286,047 B1 * | 9/2001 | Ramanathan et al. | 709/226 |
| 7,035,900 B2 * | 4/2006 | Yamaguchi et al. | 709/205 |
| 7,076,550 B1 * | 7/2006 | Noguchi et al. | 709/225 |
| 7,181,211 B1 * | 2/2007 | Phan-Anh | 709/203 |
| 2002/0095299 A1 * | 7/2002 | Iwakata | 705/1 |
| 2003/0212587 A1 * | 11/2003 | Jamison | 705/8 |

FOREIGN PATENT DOCUMENTS

| | | |
|---|---|---|
| EP | 1239372 A1 | 9/2002 |
| EP | 1276274 A2 | 1/2003 |
| JP | 08-249290 A | 9/1996 |
| JP | 10-049471 | 2/1998 |
| JP | 2002-73436 | 3/2002 |
| JP | 2002-95071 | 3/2002 |
| JP | 2002-232977 | 8/2002 |

* cited by examiner

*Primary Examiner* — Philip B Tran
(74) *Attorney, Agent, or Firm* — Sughrue Mion, PLLC

(57) ABSTRACT

A home network system and method for providing cooperative work services. The home network system has a plurality of devices connected to a network, a negotiator module connected to the devices for determining cooperative work service roles of the devices by applying device descriptions collected from the devices to a predetermined election algorithm so that the cooperative work service can be performed in consideration of a function of a corresponding device, and a coordinator module for directly performing a control command transmitted from a control device according to the cooperative work service roles determined by the negotiator module.

36 Claims, 26 Drawing Sheets

```
<?xml ...>
<root>
    <device>
        <serviceList>
            <service>
                <role>Cooperative work service role</role>
                <listenerURLforSupporter>
                        URL
                </listenerURLforSupporter>
            </service>
        </serviceList>
    </device>
</root>
```

HOME NETWORK APPARATUS AND SYSTEM FOR COOPERATIVE WORK SERVICE AND METHOD THEREOF

This application claims the priority of Korean Patent Application No. 10-2003-0024504 filed on Apr. 17, 2003 in the Korean Intellectual Property Office, the disclosure of which is incorporated herein by reference.

BACKGROUND OF THE INVENTION

1. Field of the Invention

The present invention relates to a home network apparatus and system for cooperative work service and method thereof. More particularly, the present invention is directed to a home network device and system for cooperative work service and method thereof, which allow a number of home network devices having the same services to consistently provide these services through a process of cooperative work service on a home network.

2. Description of the Related Art

In general, there has been proposed a home network in such a manner that a common virtual computing environment called middleware is established in a variety of home network devices present in an Internet Protocol ("IP")-based private network and applications are provided in the computing environment according to services that can be provided through the respective home network devices.

The middleware allows a variety of digital devices to be connected to one another in a peer-to-peer fashion and to communicate with one another. Currently available middleware includes Home AV Interoperability (HAVI), Universal Plug and Play (UPnP), Java Intelligent Network Infra-structure (Jini), LonWorks, and the like.

In a computing environment established through UPnP middleware, each of the devices uses an address that is assigned by a server through dynamic host configuration protocol (hereinafter, referred to as "DHCP") or selected by an auto IP function. Each of the devices communicates therebetween and performs the discovery/inquiry process on the network by using its assigned address.

Therefore, the respective devices present in the home network are discovered through protocol such as sampling stochastic dynamic programming (hereinafter, referred to as "SSDP"), and a control device that is called through a simple object access protocol (hereinafter, referred to as "SOAP") is used in order to control the operation of the discovered device.

FIG. 1 is a diagram schematically illustrating a related art control structure among devices.

As shown in the figure, the control structure includes a control point 9 (hereinafter, referred to as "control device") connected to the IP-based home network for controlling the home network devices operating on the network, and a plurality of home network devices 3, 5 and 7 (hereinafter, referred to as "controlled devices") for providing their own specific services onto the home network in response to a control command transmitted from the control device 9.

A service 1 (hereinafter, referred to as "service platform") exists in each of the controlled devices 3, 5 and 7 and processes a control command from the control device 9. The service platform 1 that exists in each of the controlled devices 3, 5 and 7 may be identical to one another depending on the definition of the services provided by each device.

That is, a plurality of service platforms 1 having the same service function can exist on a network.

FIG. 2 is a flowchart illustrating a related art control process among devices.

As shown in the figure, when a controlled device 3 (hereinafter, referred to as a "first device") newly connected to the network first starts to operate (S1), a predetermined address is assigned to the first device 3 using a technique such as DHCP, Auto IP, or the like (S2).

As the first device 3 to which a predetermined address has been assigned is added to the network in such a way, the discovery protocol, SSDP, informs the control device 9 and the other controlled devices 5 and 7 (hereinafter, referred to as "second and third devices", respectively) of the service provided by the first device 3 (S3).

At this time, the first device 3 multicasts a search message informing the other devices of apparatuses and services held therein. Then, the control device 9 detects the newly added first device 3 through the multicast message and confirms a device description through the URL provided from the first device 3 in order to clearly catch hold of the function of the first device 3 (S4).

Further, in addition to the description step, a service step S5 is performed. The service step is comprised of service advertisement, control, description, discovery, event, and service management. In this service step, the service provided to the network is advertised through the contents of the device description of the respective devices, which is obtained in the description step. The control command is transmitted to a control URL of a relevant device, and thus, services requested by the control device 9 are provided. Changed device information to be transmitted from a relevant device in this process is received in the form of an event message and then processed. A service management process for performing the message transmission and reception and the device control according to the service step are also included.

The above processes are repeatedly performed until the service has been completed, and a release is transferred using the SSDP technique when the service has been completed.

In addition to the service step, the device description step continues while the respective devices are operated.

Finally, when the operation of the first device 3 is completed, information regarding service termination of the first device 3 is transferred to the control device 9 and the other controlled devices 5 and 7, which are present in the home network (S6).

As home network technologies have gradually developed, a number of devices having the same services may be included in the home network or cooperate with one another to provide a specific service. Nevertheless, there is no system for coordination among the plurality of the same services in current middleware service definitions for the home network.

Therefore, if there are a number of the network resources capable of providing a display service in a home network, the display service may be provided only by a predetermined specific device among a plurality of display devices in case of a related art home network environment. Further, it is difficult to easily set services provided by a plurality of cooperating devices, e.g. an authentication service for a user or device, a scheduling service for the resources (devices, services, network resources, etc.) in the home network, and the like.

This is because a process for coordinating the services among the service providing devices has not been performed. That is, the network resources of the services present in the home network are not efficiently used.

The foregoing may further have adverse influence on home network technology as technology continues to develop. Therefore, when there are a number of the same services or services provided by a plurality of cooperating devices in the home network since a variety of devices operate simultaneously on the home network, there is still a need for removing service inconsistency among the devices and sharing functions and roles with the service providing devices so that services can be consistently provided.

SUMMARY OF THE INVENTION

Accordingly, the present invention is conceived to solve the above problems. It is a main object of the present invention to provide a service, a device structure, and a cooperative work service model for operating the service and structure so as to provide consistent services.

It is another object of the present invention to efficiently define and implement cooperative work service through the cooperative work service model.

To ensure that consistency in a plurality of services can be maintained, the present invention provides a cooperative work service management apparatus, comprising a negotiator module for determining a cooperative work service role of each device connected to a network by using descriptions collected from the devices, and a coordinator module or supporter module, which are selectively activated according to the cooperative work service role determined by the negotiator module.

As such, the home network management apparatus allows the cooperative work service thereof to be either a coordinator for directly performing a control command transmitted from a control device or controlling the control command to be performed through the other devices, a supporter belonging to the cooperative work service, or a supporter for performing the control command transmitted from the other devices or the coordinator, according to the cooperative work service role determined by the negotiator module or in the manufacture process based on service definition.

In the present invention, the cooperative work service is assumed in a case where a plurality of services having the same functions according to their service definitions exist on the network. That is, the cooperative work service means a service that is defined so that a plurality of services can be implemented into and operated as a virtual single service.

According to an exemplary embodiment of the present invention for achieving the objects discussed above, there is provided a cooperative work service management apparatus, comprising a negotiator module for determining cooperative work service roles of devices connected to a network through a predetermined election algorithm so that a cooperative work service can be performed among the devices by using descriptions collected from the devices, and a coordinator module for directly performing a control command transmitted from a control device present in the network or transmitting the control command to the other devices so as to control the operations of the devices.

According to another aspect of the present invention for achieving the above-discussed objects, there is provided a cooperative work service management apparatus, comprising a negotiator module for determining whether a service providing unit, which performs a specific service within a device to which the negotiator module belongs according to a control command transmitted from a control device, should be activated, so that a cooperative work service among devices can be performed by using descriptions collected from the devices connected to a network.

According to a further aspect of the present invention, there is provided a home network apparatus for cooperative work service, wherein it is connected to a cooperative work service management apparatus which comprises a negotiator module for determining cooperative work service roles of devices connected to a network through a predetermined election algorithm so that a cooperative work service can be performed among the devices by using descriptions collected from the devices, and a coordinator module for directly performing a control command transmitted from a control device present in the network or transmitting the control command to the other devices so as to control the operations of the devices.

According to a still further aspect of the present invention, there is provided a home network apparatus, comprising a service providing unit connected to a network for providing a predetermined service, and a negotiator module for determining whether the service providing unit within a device to which the negotiator module belongs should be activated so that a cooperative work service among devices can be performed through device descriptions collected from the devices connected to the network.

According to a still further aspect of the present invention, there is provided a home network system for cooperative work service, comprising a plurality of devices connected to a network, a negotiator module connected to the devices for determining cooperative work service roles of the devices by applying device descriptions collected from the devices to a predetermined election algorithm so that the cooperative work service can be performed in consideration of a function of a corresponding device, and a coordinator module for directly performing a control command transmitted from a control device according to the cooperative work service roles determined by the negotiator module.

According to a still further aspect of the present invention, there is provided a home network system, comprising a plurality of devices connected to a network, a service providing unit connected to each of the devices for providing a predetermined service, and a negotiator module for determining whether the service providing unit within a device to which the negotiator module belongs should be activated so that a cooperative work service among the devices can be performed through device descriptions collected from the devices connected to the network.

According to a still further aspect of the present invention, there is provided a cooperative work service method, comprising the steps of causing a cooperative work service to inform the other cooperative work services connected to a network of its own presence and to exchange service descriptions with the cooperative work services having the same service functions, determining a role of the cooperative work service by using the provided service descriptions and a predetermined election algorithm, and selectively executing a coordinator module or a supporter module according to the determined role.

According to a still further aspect of the present invention, there is provided a cooperative work service method, comprising the steps of causing a cooperative work service to inform the other cooperative work services connected to a network of its own presence and to exchange service descriptions with the services having the same service functions, determining a role of the cooperative work service by using the provided service descriptions and a predetermined election algorithm, and executing or terminating the relevant service according to the determined role.

BRIEF DESCRIPTION OF THE DRAWINGS

The above and other objects, features and advantages of the present invention will be apparent from the following description of preferred embodiments of the invention in conjunction with the accompanying drawings, in which.

DETAILED DESCRIPTION OF THE INVENTION

The configuration and operation of a cooperative work service management apparatus according to the present invention will be hereinafter explained with reference to the accompanying drawings.

Figure 1:
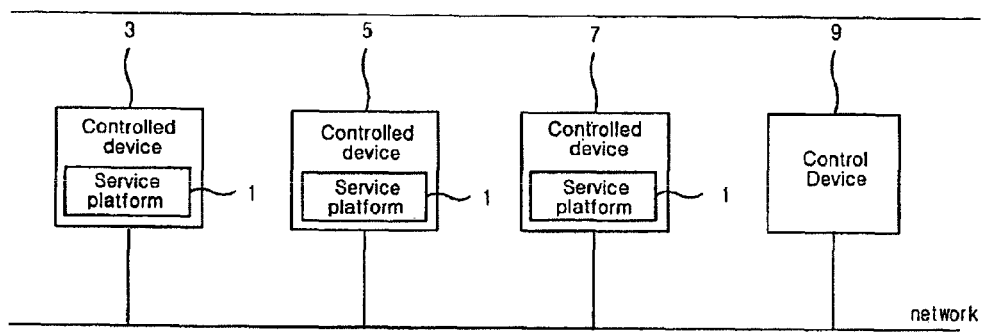
FIG. 1 is a diagram schematically illustrating a conventional control structure among devices.
Figure 2:
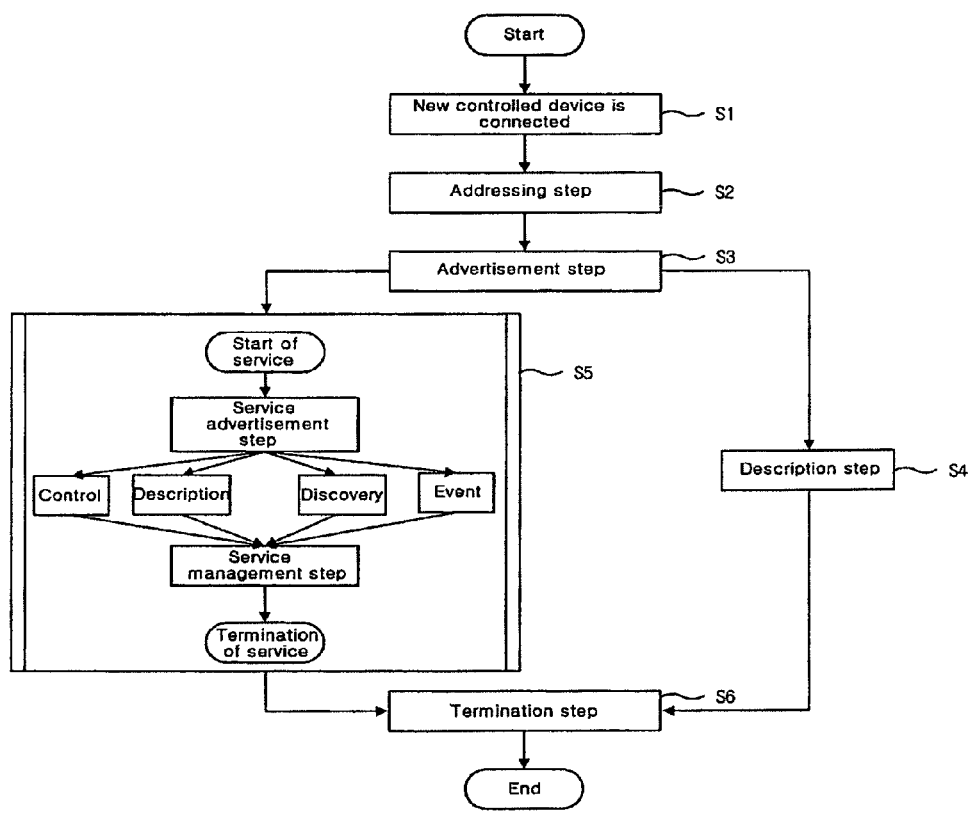
FIG. 2 is a flowchart illustrating a conventional control process among devices.
Figure 3:
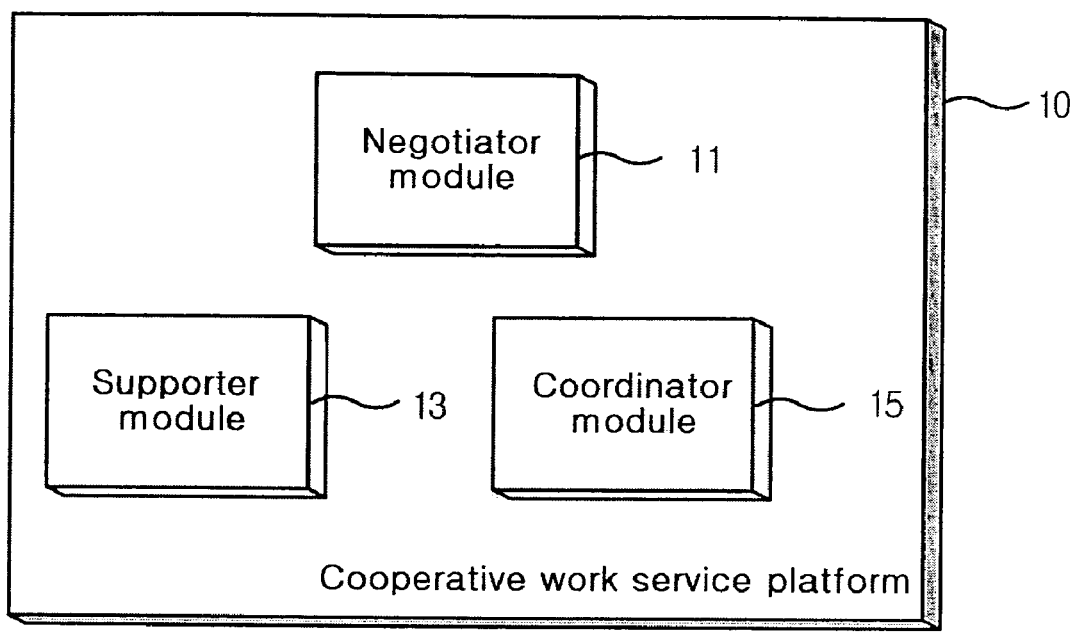
FIG. 3 is a diagram schematically illustrating the structure of a cooperative work service platform according to an embodiment of the present invention.

FIG. 3 is a diagram schematically illustrating the structure of a cooperative work service platform 10 according to an embodiment of the present invention.

As shown in FIG. 3, the cooperative work service platform 10 comprises a negotiator module 11 which determines a cooperative work service role using device descriptions and service description collected from devices operating on the network (hereinafter, referred to as "descriptions") and a predetermined election algorithm, a supporter module 13 which performs the operation according to the cooperative work role determined by the negotiator module 11, and a coordinator module 15 which directly performs a control command transmitted from a control device or transmits a control command to the supporter module 13 to allow the transmitted control command to be processed therein according to the cooperative work service role determined by the negotiator module 11.

Here, the supporter module 13 may be included in either a device to which it belongs or any other device among the devices connected to the home network.

The election algorithm is an algorithm written in a predetermined programming language (e.g., C, C++, visual C/C++, Java, etc.), which serves to coordinate the cooperative work service roles of the negotiator modules in the devices that provide the same services, using the descriptions provided by the respective devices present in the network.

The cooperative work service roles determined through the election algorithm are defined in the form of a coordinator implemented through the coordinator module 15, a supporter implemented through the supporter module 13, a coordinator-supporter combo implemented through the coordinator module 15 and the supporter module 13, or the like. The coordinator-supporter combo may be classified as either a type in which the modules for performing the roles of the coordinator and the supporter are divided or an integral type in which the two modules are integrated into one module.

The supporter module 13 or the coordinator module 15 of the cooperative work service platform provided in each of the devices is forked or killed by the negotiator module 11 in accordance with the cooperative work service role, so as to perform the operation relevant to the role.

Such an election algorithm may be set according to service policy and can be applied in various ways. For example, the election algorithm may have a basic target for causing all the cooperative work services to maintain their own roles, determining the cooperative work service role according to a predetermined cooperative work service level, determining the cooperative work service role according to a version of the same cooperative work service, or the like.

Figure 4:
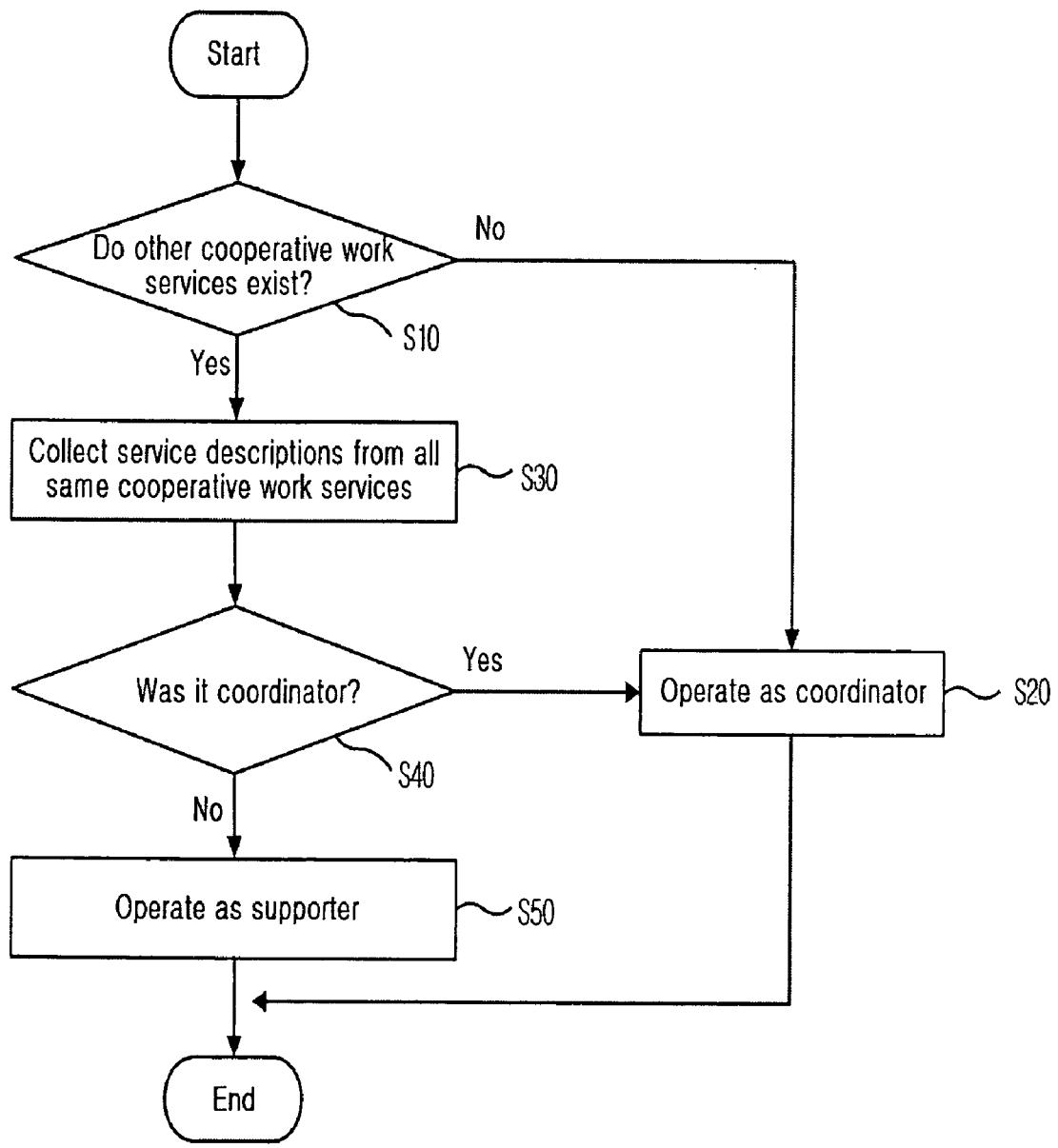
FIG. 4 is a flowchart schematically illustrating a keep Role election algorithm according to an embodiment of the present invention.

FIG. 4 schematically illustrates the process of the keep Role election algorithm according to an embodiment of the present invention.

As shown in FIG. 4, whether the other cooperative work services exist is determined through a discovery-advertisement process wherein a device newly connected to the network informs the devices operating on the network of its presence (S10).

If it is determined that there are no other cooperative work services, a cooperative work service role of the newly added device is determined to be a coordinator (S20). Otherwise, the service descriptions are collected from all the same cooperative work services (S30).

Then, it is determined whether the newly added device was the coordinator, according to the keep Role election algorithm, when determining its own cooperative work service role using the collected service descriptions (S40). As a result of the determination, if the device was the coordinator, the device operates as a coordinator (S20). Otherwise, the cooperative work service role is determined to be a supporter so that the device operates as a supporter (S50).

Further, if the cooperative work service role for each of the controlled devices is determined by the election algorithm, the negotiator module 11 sets the determined role into the description of a relevant device so that cooperative work services among the devices that provide the same service can be made.

Figures 5, 6A:
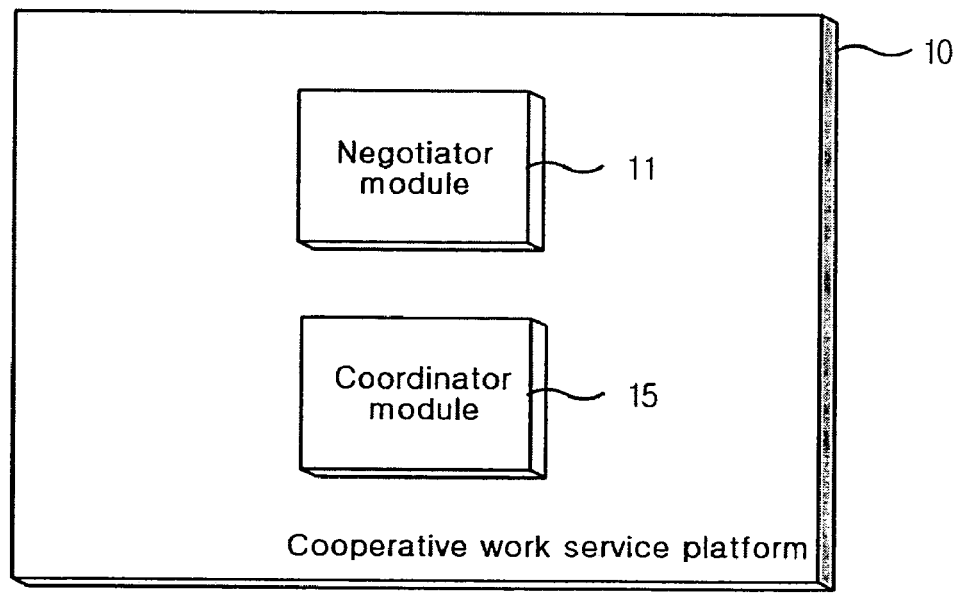
FIG. 5 schematically shows a template added to a description for supporting the cooperative work service according to an embodiment of the present invention.
FIGS. 6a to 6e are diagrams schematically illustrating the structures of the cooperative work service platforms according to an embodiment of the present invention.

FIG. 5 schematically shows a template that is added to the description to support the cooperative work service according to an embodiment of the present invention.

As shown in FIG. 5, a tag <role></role> is used to set a cooperative work service role, and a tag <ListenerURLForSupporter></ListenerURLForSupporter> is used to set the URL for transmitting an event message, which is generated in the supporter module 13 according to the cooperative work service, to the coordinator module 15.

The "role" is set to be optional in case of a device that provides cooperative work service. That is, the "role" is set to be undefined until the cooperative work service role is determined after the device accesses the network to begin its operation. If the cooperative work service role has been determined, the "role" is set as a coordinator or a supporter, which is determined by the negotiator module.

Further, the negotiator module 11 controls the operation for forking/killing the coordinator module 15 or the supporter module 13 according to the cooperative work service role determined by the election algorithm, so that only a module corresponding to the cooperative work service role is activated. FIGS. 6a to 6e schematically illustrate the structures of these cooperative work service platforms according to an embodiment of the present invention.

Figure 6B:
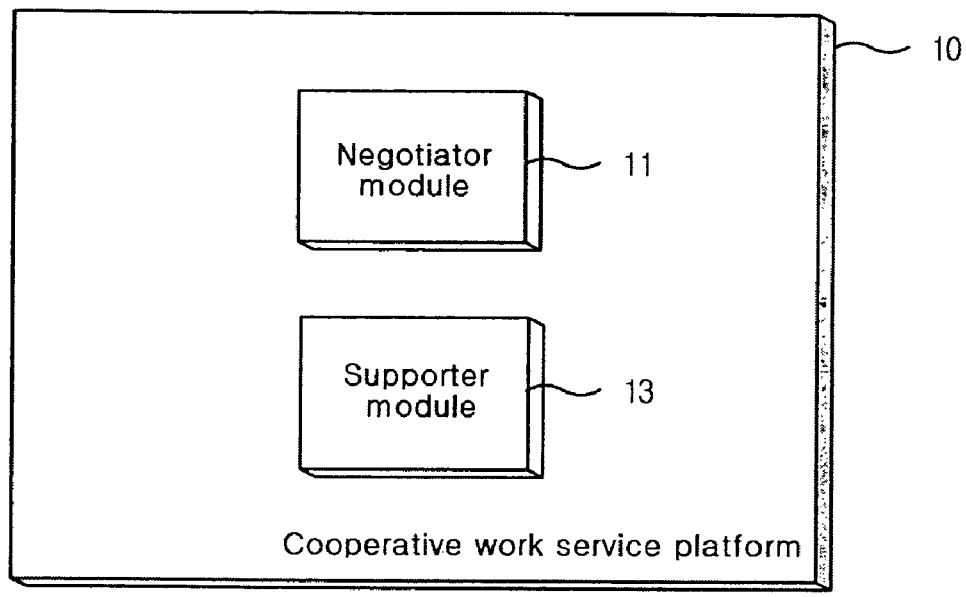
Figure 6C:
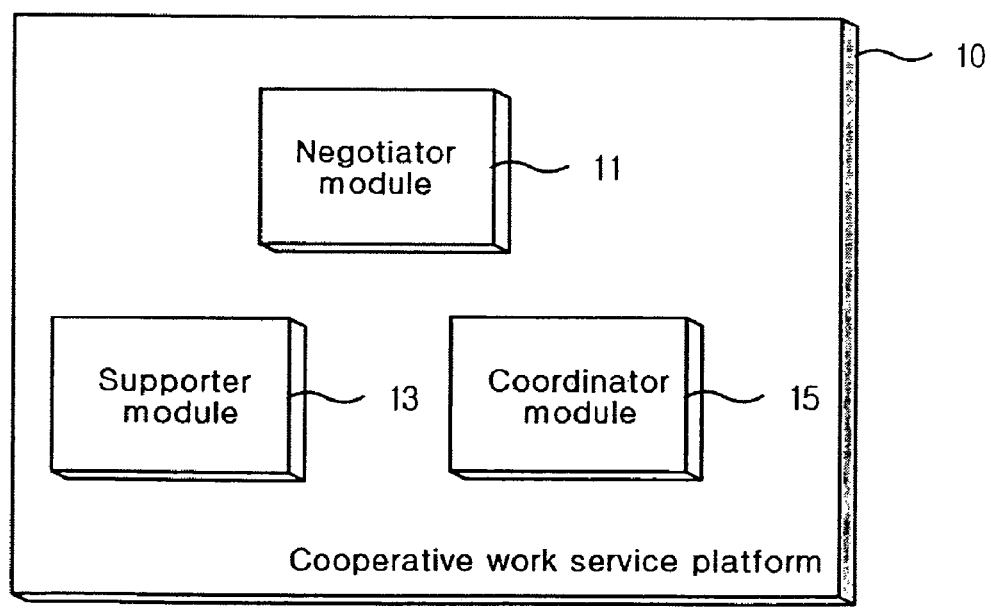
Figure 6D:
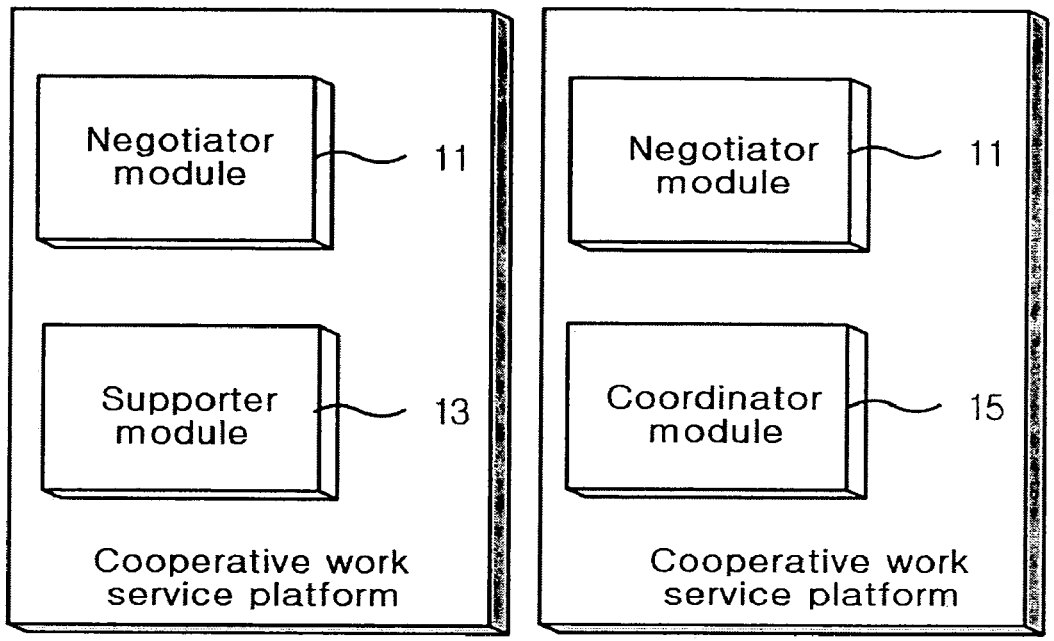
Figure 6E:
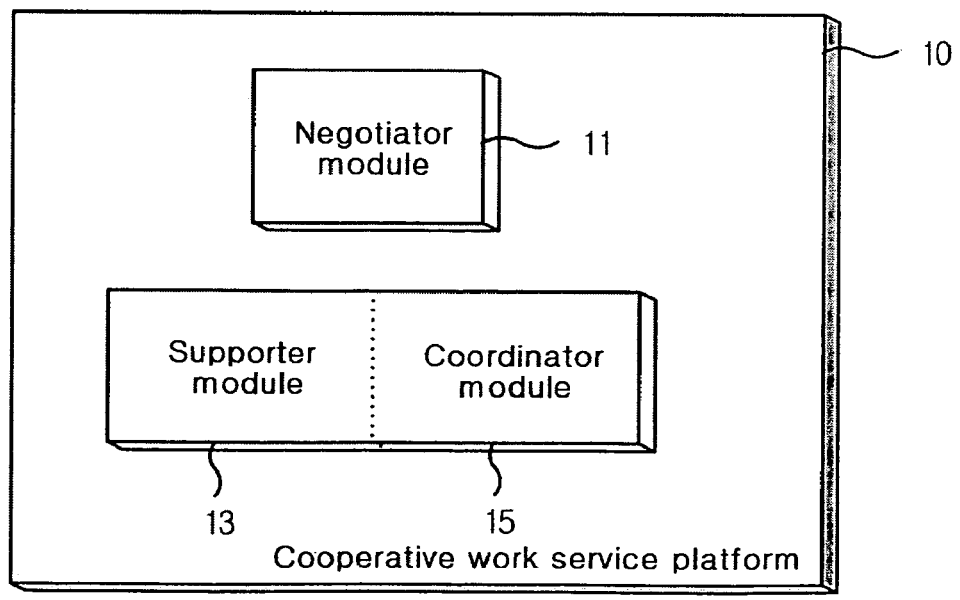

As shown in these figures, since the operation of the negotiator module 11 is essential for use in the cooperative work service, a cooperative work service platform 10 for providing the cooperative work service as a coordinator is implemented to include the negotiator module 11 and the coordinator module 15 (FIG. 6a). The cooperative work service platform 10 for providing the cooperative work service as a supporter may be implemented to include the negotiator module 11 and the supporter module 13 (FIG. 6b). Further, the cooperative work service platform 10 for providing the cooperative work service as a coordinator-supporter combo may be implemented to have a construction in which the supporter module 13 and the coordinator module 15 are separated from each other (FIG. 6c), a construction in which a platform including the supporter module 13 and a platform including the coordinator module 15 are separated (FIG. 6d), or a construction in which the supporter module 13 and the coordinator module 15 are combined into a single module (FIG. 6e).

For reference, in the aforementioned cooperative work service platform according to the present invention, all modules may be configured in hardware, some modules in software, or all modules in software.

Therefore, it will fall within a scope and spirit of the present invention that the cooperative work service platform according to the present invention is configured in hardware or software, and it will also be apparent that various changes and modifications thereof can be made thereto without departing from the scope and spirit of the present invention.

The configuration and operation of the cooperative work service system using the cooperative work service platform 10 according to the present invention so constructed will be described hereinafter in detail.

In the present invention, it is described that a home network system corresponding to a typical example of a local network is used and the home network system is implemented through a home network environment using UPnP middleware. However, it is intended to be illustrative and not restrictive. It will be easily understood by those skilled in the art that various modifications and equivalents can be made to the modules for allowing the cooperative work service to be performed among the devices, which provide the same services, in the home network environment where the middleware of a dynamic mechanism such as JINI, HAVI, home wide web (HWW) and LonWorks as well as UPnP are used.

Furthermore, a cooperative work service management apparatus may be implemented in separate hardware externally or internally connected to the home network apparatus, or in software provided within or out of the home network apparatus. Hereinafter, it will be explained that the cooperative work service platform having the software structure provided within the home network apparatus is employed in the home network system.

Figure 7:
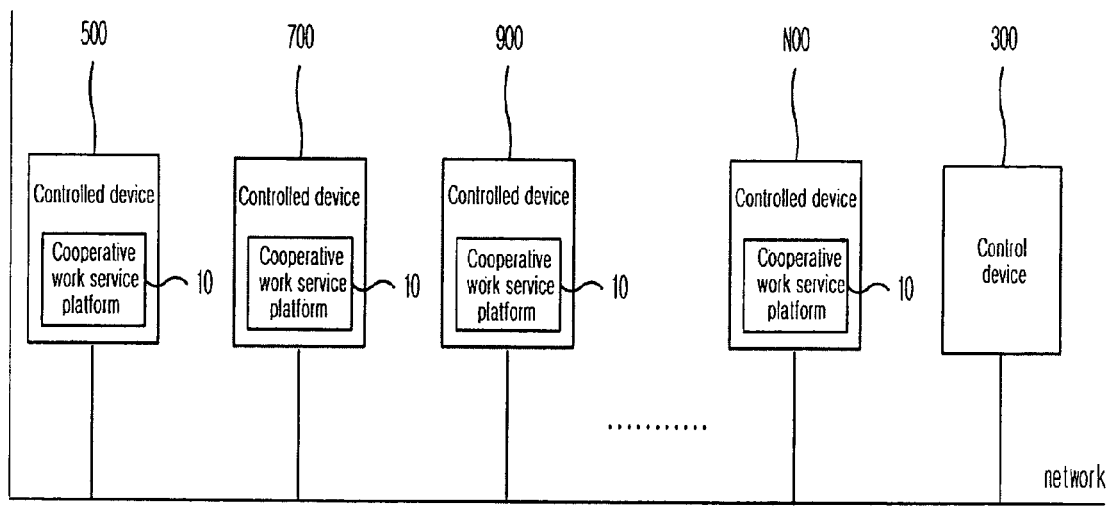
FIG. 7 is a diagram schematically illustrating the configuration of a home network system according to an embodiment of the present invention.

FIG. 7 schematically illustrates the configuration of the home network system according to an embodiment of the present invention.

As shown in FIG. 7, a home network system comprises a plurality of controlled devices 500, 700, 900, . . . , N00, each of which is connected to the network and includes the cooperative work service platform 10 for determining the cooperative work service role and performing a relevant cooperative work service in accordance with the determined role so that consistency among the same cooperative work services can be maintained, and a control device 300 for controlling the operations of the controlled devices 500, 700, 900, . . . , N00.

The cooperative work service platform 10 included in each of the controlled devices 500, 700, 900, . . . , N00 is constructed as described above (See FIG. 3). That is, the cooperative work service role of each of the controlled device 500, 700, 900, . . . , N00 is determined by the negotiator module 11 of the cooperative work service platform 10, and the supporter module 13 and/or the coordinator module 15 are/is then activated in conformity with the determined role so as to provide the service requested by the control device 300 through the determined cooperative work service role.

A cooperative work service method using the home network system for performing such a cooperative work service according to the present invention will now be described in detail with reference to the accompanying drawings.

Figure 8:
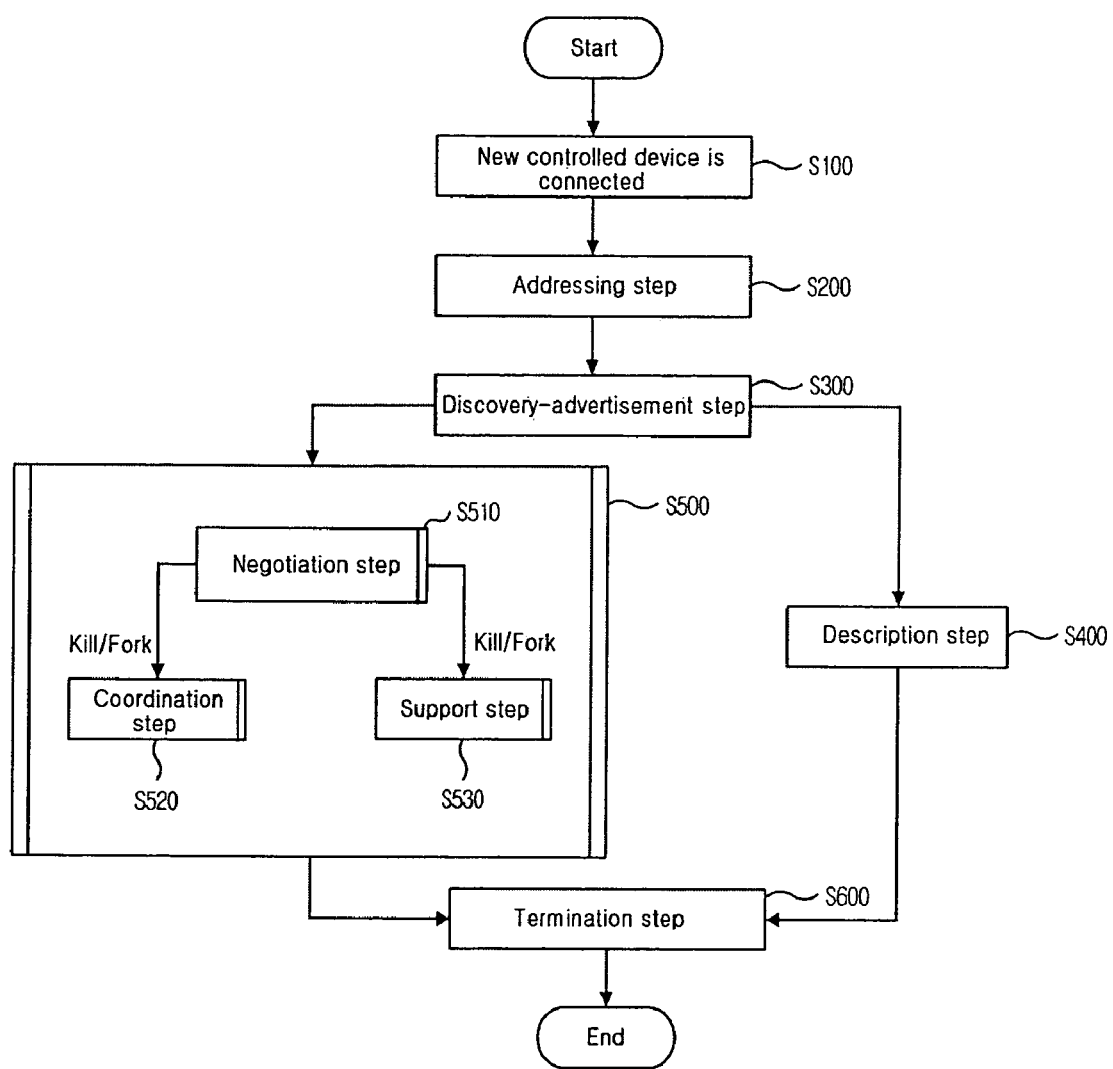
FIG. 8 is a flowchart illustrating a process for controlling devices using the cooperative work service according to an embodiment of the present invention.

FIG. 8 is a flowchart illustrating a device control process using the cooperative work service according to an embodiment of the present invention.

As shown in FIG. 8, if a new first device 500 is connected to the network and starts to operate (S100), an addressing step for assigning a predetermined address to the first device 500 using DHCP technology, Auto IP, or the like, according to UPNP device architecture is performed and determining the IP address is first performed (S200).

Then, the first device 500 performs a discovery-advertisement step in which advertisement messages are multicast to the control device 300 and the other devices 700, 900, . . . , N00 operating on the network according to the discovery protocol, i.e. SSDP (S300).

In this process, the control device 300 that has received the multicast advertisement message from the first device 500 registers the first device 500 onto a controllable device list, in a case where it can control the relevant first device. To more specifically catch hold of the function of the first device 500, the control device 300 also performs a description step S400 of requesting and receiving the descriptions.

At this time, since the first device 500 is in a state where the cooperative work service role thereof has not yet been determined, the "role" in the cooperative work service template added to the descriptions is kept an undefined state.

The descriptions may comprise other logical devices and services included in the first device 500. The device descriptions are expressed in XML and include manufacturing information from the supplier (model name, serial no., manufacturer name, manufacturer URL, etc.).

The descriptions can include lists of several embedded devices and services as well as URLs related to control, events and presentations.

In addition to the description step, the control device 300 performs a cooperative work service step S500 for coordinating the service roles of the newly added first device 500 and the controlled devices 700, 900, . . . , N00 operating on the network so as to be harmonized with the already operating cooperative work services, controlling the operation of the supporter module 13 or the coordinator module 15 in the cooperative work service platform 10 according to the coordinated role, and performing the cooperative work service.

The cooperative work service step S500 comprises a negotiation step S510 of causing the negotiator module 11 of the cooperative work service platform 10 to collect the descriptions provided from the devices operating on the network and to determine the cooperative work service role of a relevant device, a coordination step S520 of activating the coordinator module 15 in accordance with the role determined by the negotiator module 11 to operate as a coordinator, and a support step S530 of activating the supporter module 13 in accordance with the role determined by the negotiator module 11 to operate as a supporter.

Then, the first device 500 performs a termination step S600 of completing the operation of the device control process on the network.

Figure 9:
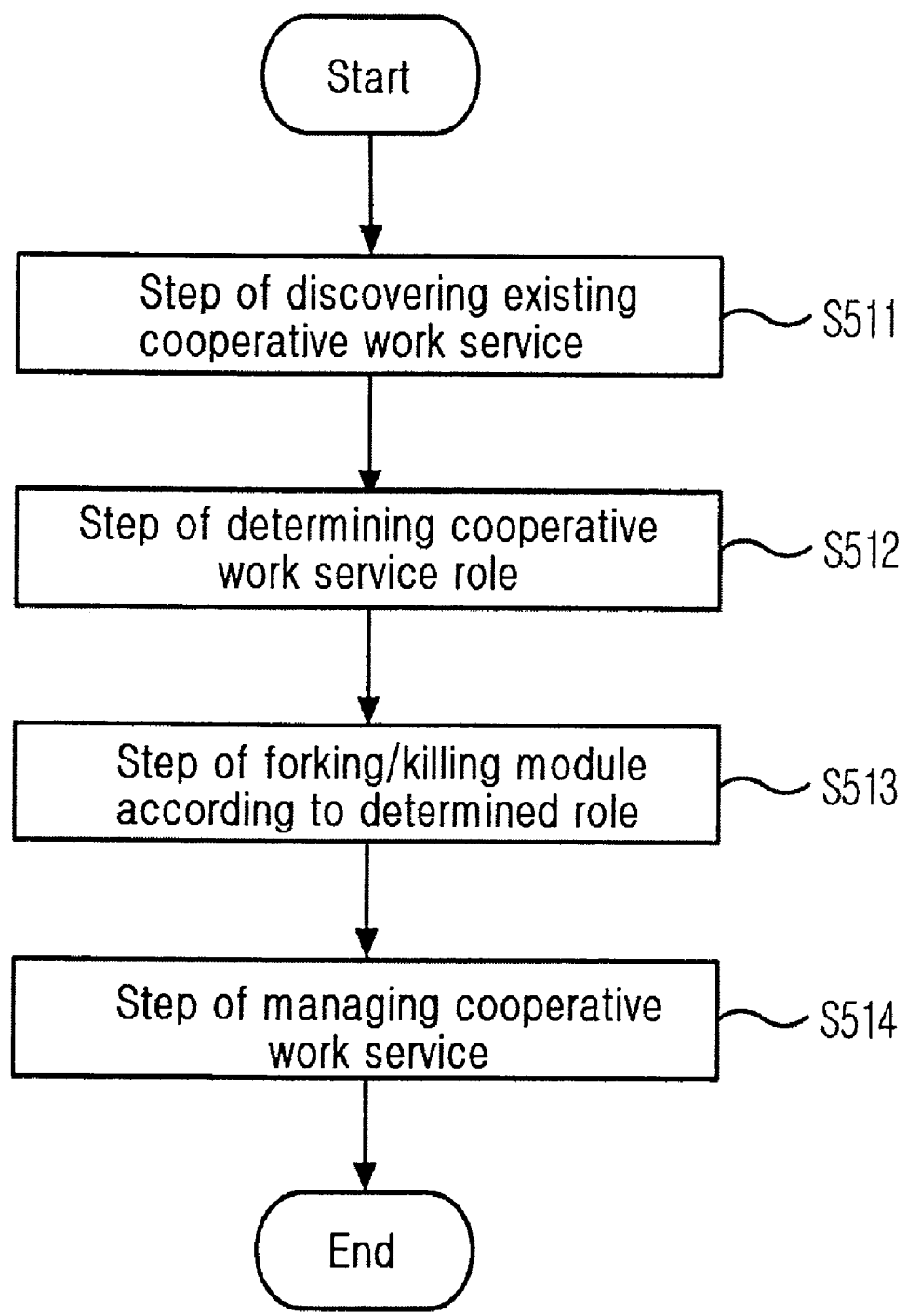
FIG. 9 is a flowchart specifically illustrating the process of step S510 in FIG. 8.

FIG. 9 is a flowchart specifically illustrating the negotiation step S510 shown in FIG. 8.

As shown in FIG. 9, in the negotiation step S510, a cooperative work service discovery step of discovering the cooperative work services already operating on the network by using the cooperative work service discovery protocol is first performed (S511). A cooperative work service role determination step of causing the negotiator module 11 of the first device 500 to confirm the controlled devices 700, 900, . . . , N00 that provide the same services and to coordinate the cooperative work service roles thereof through the election algorithm by using the descriptions provided from the controlled devices 700, 900, . . . , N00 is then performed (S512).

At this time, the cooperative work service role determination is made depending on the functions of the cooperative work services to be provided, and is specified as an election algorithm and policy determination.

If all the controlled devices 700, 900, . . . , N00 participating in the process of the cooperative work service role determination perform the same algorithm based on the same information, they can generate role information on all the cooperative work services. If the election algorithms based on different information are used in the controlled devices or the election algorithms are different from each other, however, each of the devices can determine its own role. In such a case, there is a need for another protocol that can confirm and detect the cooperative work service roles of the other devices.

After the cooperative work service roles of the controlled devices 700, 900, . . . , N00 that provide the same services have been determined through the cooperative work service role determination step S512, the negotiator module 11 of each of the devices performs a module fork/kill step S513 of controlling the operation of the supporter module 13 or coordinator module 15 by activating or inactivating the supporter module 13 or coordinator module 15 according to the determined cooperative work service role.

Next, the negotiator module 11 performs a cooperative work service management step S514 of determining whether a new controlled device that provides the same service is added and managing the cooperative work services according to the determined cooperative work service roles.

In this negotiation step S510, the discovery protocol for discovering the cooperative work service already operating on the network multicasts a search message informing its own cooperative work service to the respective devices and exchanges descriptions with the other devices, which have the same cooperative work services and have received the multicast messages, in the same manner as the existing discovery protocols.

Figure 10:
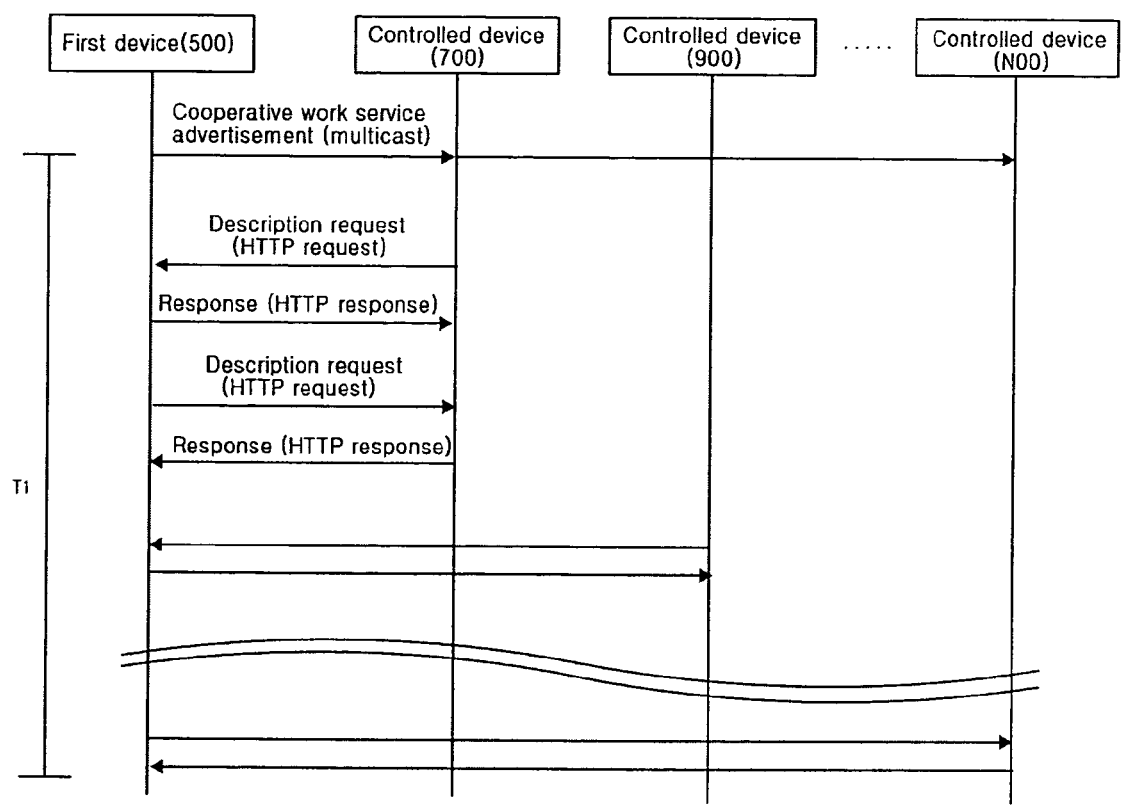
FIG. 10 schematically shows a process of executing a cooperative work service discovery protocol according to an embodiment of the present invention.

FIG. 10 schematically shows a process of executing the cooperative work service discovery protocol according to an embodiment of the present invention, with priority given to the newly added first device 500.

As shown in FIG. 10, when the first device 500 is newly connected to the network and then starts to operate, the cooperative work service platform 10 of the first device 500 transmits a coordination service advertisement message representing its own service to all the controlled devices 700, 900, . . . , N00 operating on the network.

The coordination service advertisement message is multicast using the Hyper Text Transfer Protocol (HTTP protocol), i.e. using an address other than 239.255.255.250:1900 reserved by the SSDP or "NOTIFY with ssdp:alive" according to the UPnP device architecture.

The controlled devices 700, 900, . . . , N00, which provide the same cooperative work services as the first device 500, among the devices that received the advertisement message, request the first device 500 for profile information (i.e., device description) within a prescribed period of time (Ti) and then collect the profile inforamtion.

At this time, a profile request (Get service description, Http get) message and a response (Http response) message are transmitted/received to/from the controlled devices 700, 900, . . . , N00 that provide the same cooperative work service as the first device 500, according to the HTTP protocol.

The negotiator modules 11 of the first device 500 and the controlled devices 700, 900, . . . , N00 determine their own cooperative work service roles through the election algorithm, by using the descriptions collected in this process.

Figure 11:
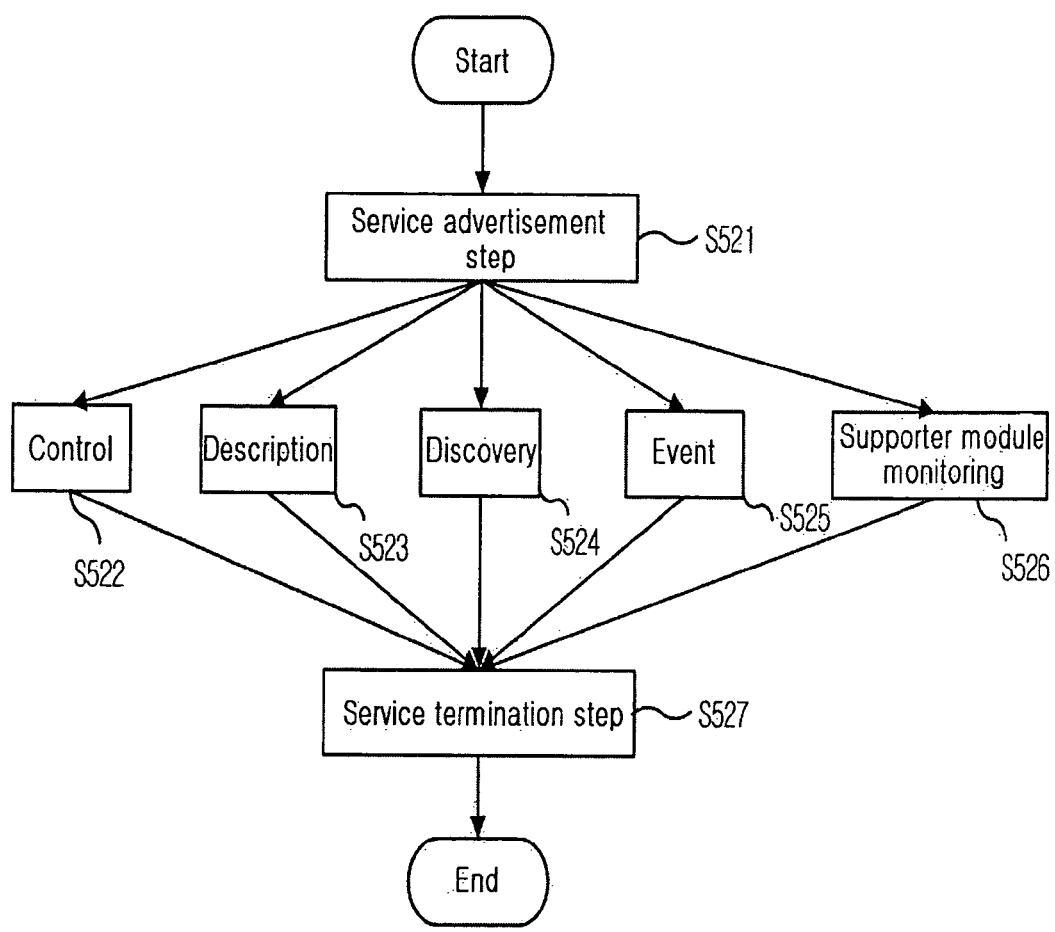
FIG. 11 is a flowchart specifically illustrating the process of step S520 in FIG. 8.

FIG. 11 is a flowchart illustrating the coordination step S520 in FIG. 8.

As shown in FIG. 11, if the cooperative work service role of a device is determined as a coordinator by the negotiator module 11, the coordinator module 15 performs a service advertisement step of informing the other devices of its own determined cooperative work service. (S521)

Then, the coordinator module 15 performs a control process S522, description process S523, discovery process S524 and event process S525 for processing the control command transmitted from the control device 300, and also performs a supporter module monitoring process S526 for recognizing and detecting a change in the state of the supporter module 13.

The control process S522 includes the process of controlling the operation of the supporter module 13 through the control protocol and providing the service requested by the control device 300.

When the device operation of the coordinator module 15 is finished during all the processes S522, S523, S524, S525 and S526, a service termination step for completing the service operation is performed (S527).

Similar to the existing control protocols, the control protocol for controlling the operation of the supporter module 13 in such a coordination step S520 transmits an action message requesting a predetermined service from the coordinator module 15 to the supporter module 13 according to the control command transmitted from the control device 300, and receives a response from the supporter module 13 that received the action message.

Figure 12:
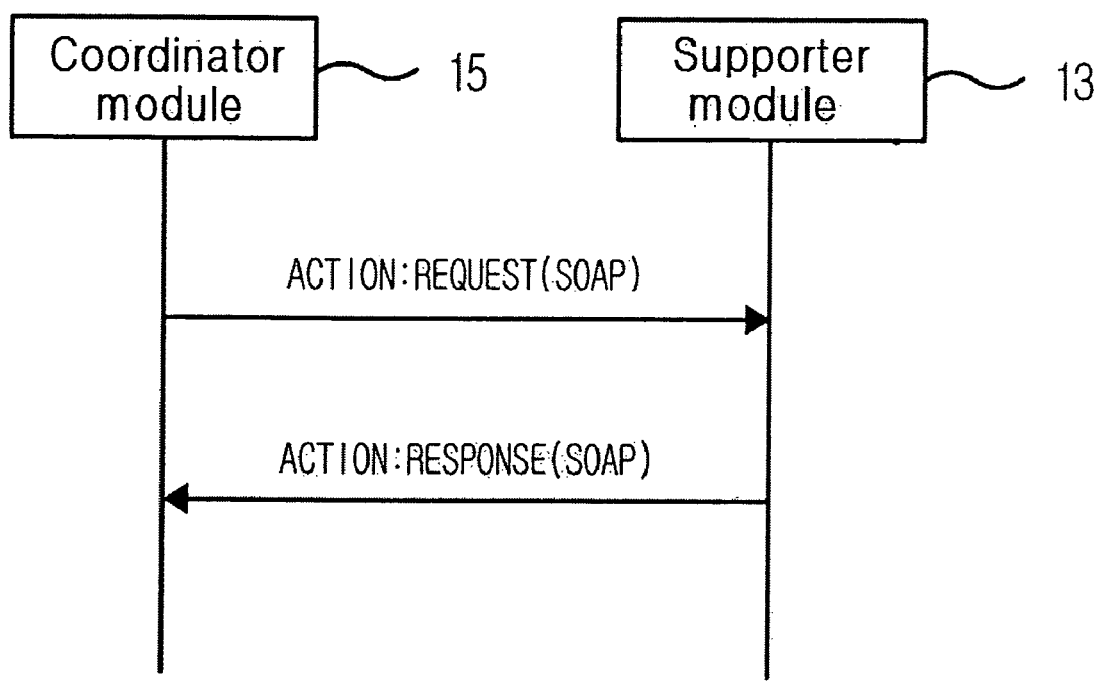
FIG. 12 schematically shows a control protocol process according to an embodiment of the present invention.

FIG. 12 schematically shows a process for executing the control protocol according to an embodiment of the present invention.

As shown in FIG. 12, in a case where the coordinator module 15, which serves as a coordinator and executes the control command transmitted from the control device 300, intends to transmit the control command to the supporter module 13 and intends to cause the supporter module 13 to provide a relevant service, the coordinator module transmits a control message (ACTION:REQUEST) requesting the relevant supporter module 13 for a predetermined service and then receives a response message (ACTION:RESPONSE), using SOAP according to UPnP device architecture.

These control and response messages can be transmitted/received using the URLs of the devices obtained in the initialization process and can be expressed into XML using SOAP.

Figure 13:
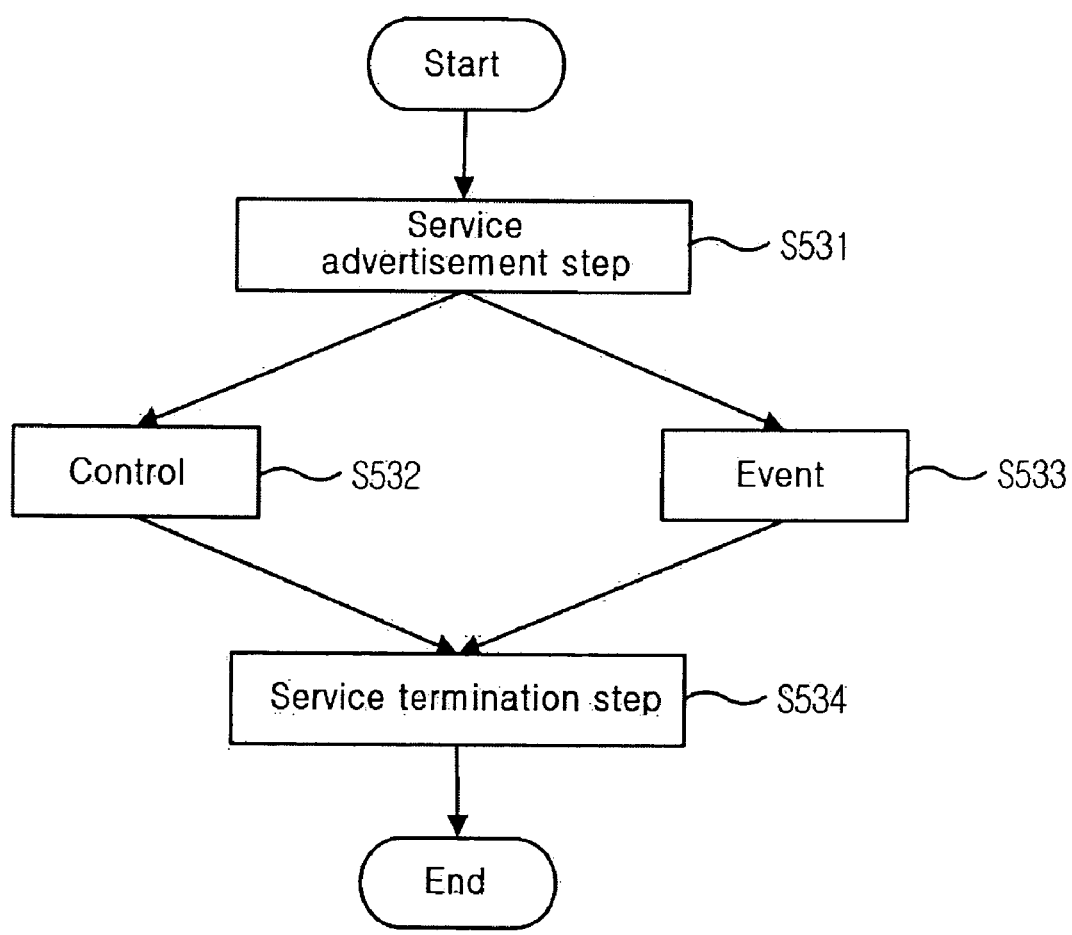
FIG. 13 is a flowchart specifically illustrating the process of step S530 in FIG. 8.

FIG. 13 is a flowchart specifically illustrating the support step S530 in FIG. 8.

As shown in FIG. 13, if the cooperative work service role of a device is determined as a supporter by the negotiator module 11, the supporter module 13 performs a service advertisement step of informing the other devices of its own determined service (S531).

Then, the supporter module 13 performs a control process S532 for executing the control command of the coordinator module 15 that causes the supporter module to provide a specific service, and an event process S533 for advertising a change in the state of the supporter module according to the operation control of the coordinator module 15 to the coordinator module 15 through the event protocol.

Thereafter, when the device operation of the supporter module 13 is finished, the service termination step of completing the service operation is performed (S534).

In particular, since the discovery, description, etc. that should be included in common UPNP devices are not performed in such a supporter module 13, the supporter module 13 is not known to the control device 300, but is known only to the coordinator module 15 based on operations of the negotiator module 11.

Similar to the existing event protocols, the event protocol for causing the supporter module 13 to inform the coordinator module 15 of modified information in the support step S530, transmits an event message including the modified information from the supporter module 13 to the coordinator module 15 and receives a response from the coordinator module 15 that received the event message.

Figure 14:
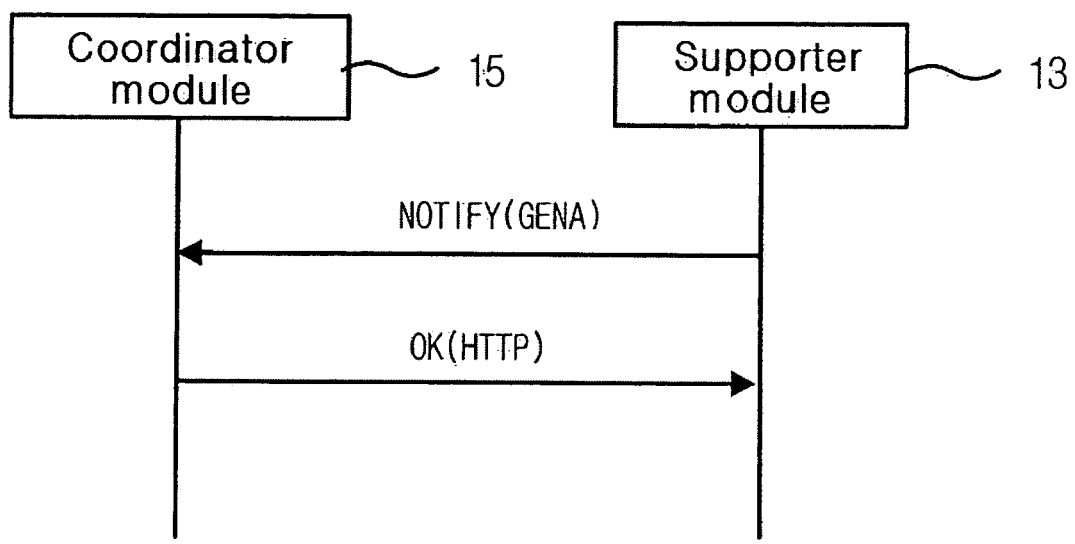
FIG. 14 is a diagram schematically illustrating an event protocol process according to an embodiment of the present invention.

FIG. 14 is a diagram schematically illustrating a process of executing the event protocol according to an embodiment of the present invention.

As shown in FIG. 14, in order to inform the coordinator module 15 of a change in the state of the supporter module 13 that provided the predetermined service in response to the control command transmitted from the coordinator module 15, the supporter module transmits the event message (NOTIFY) in an XML format which is formatted through general event notification architecture (GENA).

The coordinator module 15 receives the event message from the supporter module 13 to process the received message into a description update item for the device to which the coordinator module 15 belongs, and transmits the response message (OK) using the HTTP protocol.

To perform the event processing protocol between the coordinator module 15 and the supporter module 13, it is required that the supporter module 13 know the URL of the coordinator module 15.

Accordingly, to allow the supporter module 13 to recognize the URL of the coordinator module 15, either a method by which the coordinator module 15 subscribes directly to the supporter module 13 at the initial process or at the time when the cooperative work service of a new supporter role starts, or a method by which the supporter module 13 refers to the description of the coordinator module 15, may be used.

Hereinafter, a cooperative work service method according to an embodiment of the present invention will be described in detail with reference to the accompanying drawings.

FIGS. 15a to 15f are diagrams schematically illustrating the device control structures for performing the cooperative work services according to the embodiments of the present invention, wherein the cooperative work service platforms 10 included in the devices are implemented according to the embodiments of the present invention.

Figure 15A:
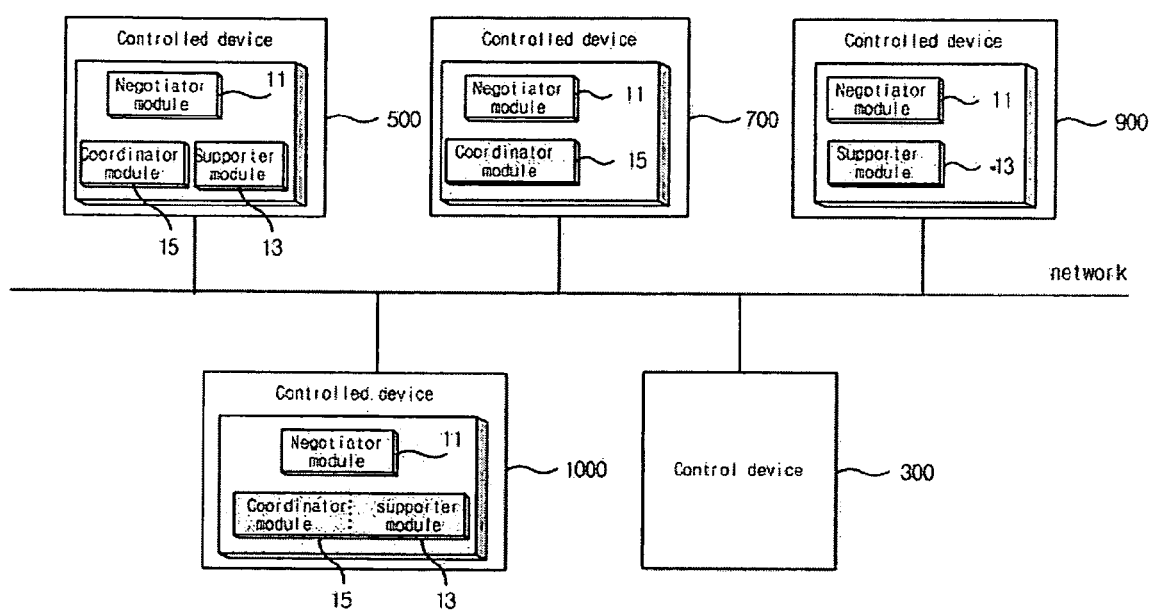
FIGS. 15a to 15f are diagrams schematically illustrating the device control structures for executing the cooperative work services according to an embodiment of the present invention.

FIG. 15a shows the cooperative work service structure in which the service is performed by a single coordinator-supporter combo. The first device 500 newly added to the network informs the control device 300 and the controlled devices 700, 900 and 1000 (hereinafter, referred to as "second, third and fourth devices", respectively) already present in the network, through the addressing and discovery-advertisement processes, that the first device 500 operates on the network.

In the addressing and discovery-advertisement processes, the negotiator module 11 of the first device 500 detects the second, third and fourth devices 700, 900 and 1000 that provide the same services, and receives the descriptions from the respective devices to coordinate the cooperative work service roles among the devices.

In this process, if the newly added first device 500 performs the service for the resources or information that can be exclusively used as compared to the other devices 700, 900 and 1000, the negotiator module 11 of the first device 500 selects the coordinator-supporter combo role to perform all the services on the network through the first device 500.

Accordingly, the first device 500 performs both the coordinator and supporter roles in the service provision process. In the cooperative work service platforms 10 of the other devices 700, 900 and 1000, however, only the negotiator modules 11 operate and both the coordinator modules 15 and the supporter modules 13 do not operate in the inactivated state.

Figure 15B:
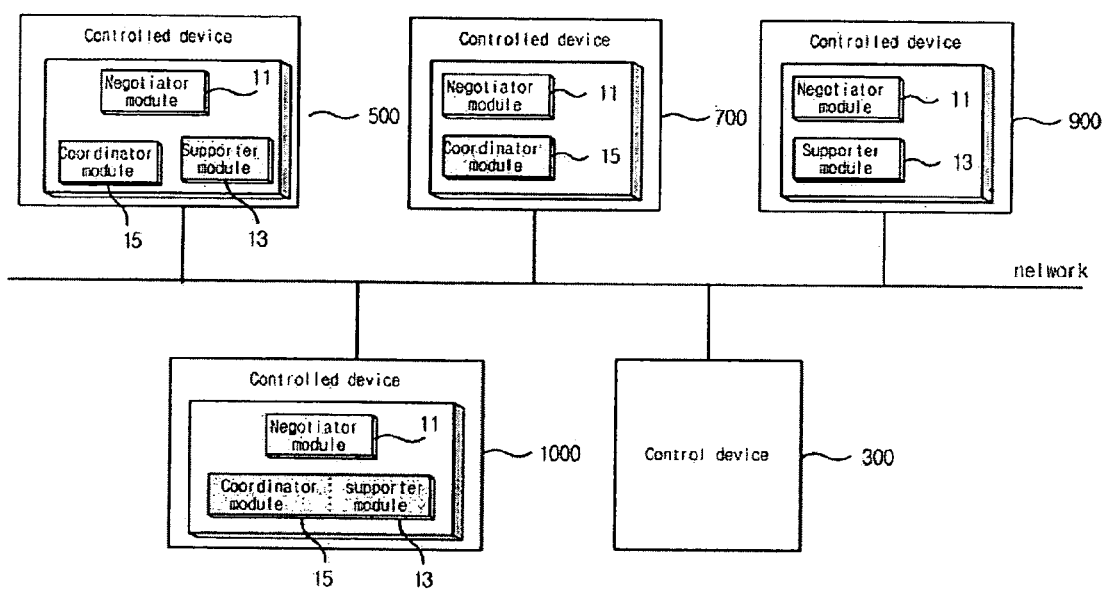

FIG. 15b illustrates the cooperative work service structure in which the service is performed through one coordinator and one supporter. Unlike a single coordinator-supporter combo mode, the roles of the coordinator and the supporter are separated so that the cooperative work services can be provided through the individual devices 500 and 900.

That is, if the cooperative work service role of the first device 500 is determined as a coordinator and the cooperative work service role of the third device 900 is determined as a supporter, the negotiator module 11 of the first device 500 kills the supporter module 13 of the first device 500 to be inactivated.

Accordingly, the cooperative work service is performed through the supporter module 13 of the third device 900 controlled by the coordinator module 15 of the first device 500.

Figure 15C:
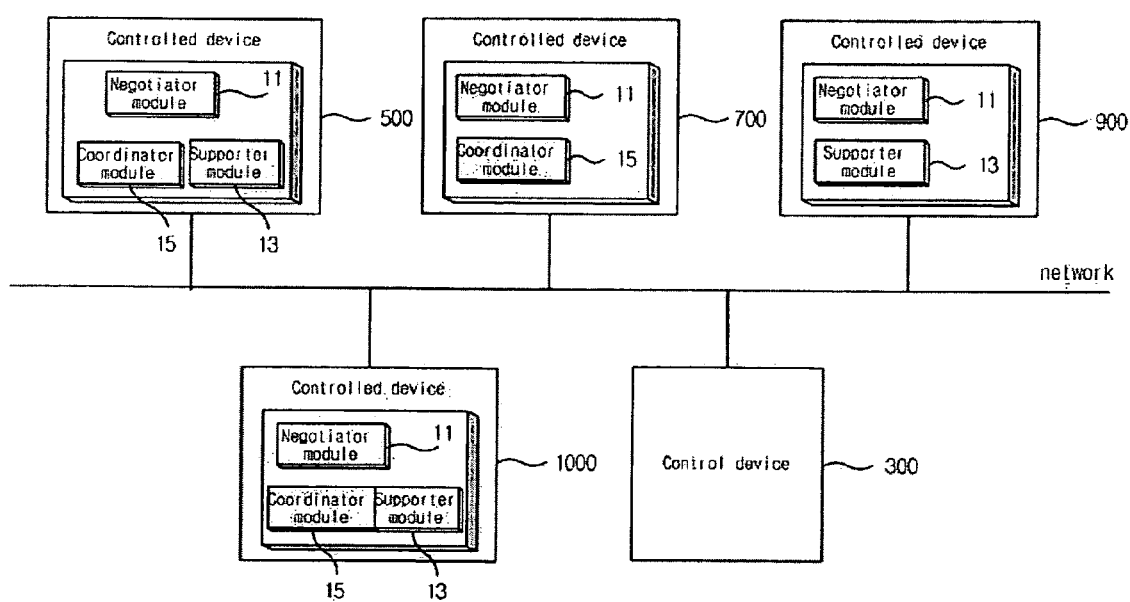

FIG. 15c illustrates the cooperative work service structure in which the service is performed through one coordinator and a plurality of the supporters, wherein the plurality of supporters are controlled by the one coordinator.

That is, if the cooperative work service role of the first device 500 is determined as a coordinator-supporter combo and the cooperative work service roles of the third and fourth devices 900 and 1000 are determined as a supporter, the negotiator module 11 of the first device 500 operates (forks) the supporter module 13 to be activated. Further, the negotiator module 111 of the fourth device 1000 operates (forks) the supporter module 13 of the coordinator/supporter module to be activated.

Accordingly, the service is provided through the supporter modules 13 of the first, third and fourth devices 500, 900 and 1000 controlled by the coordinator module 15 of the first device 500.

Figure 15D:
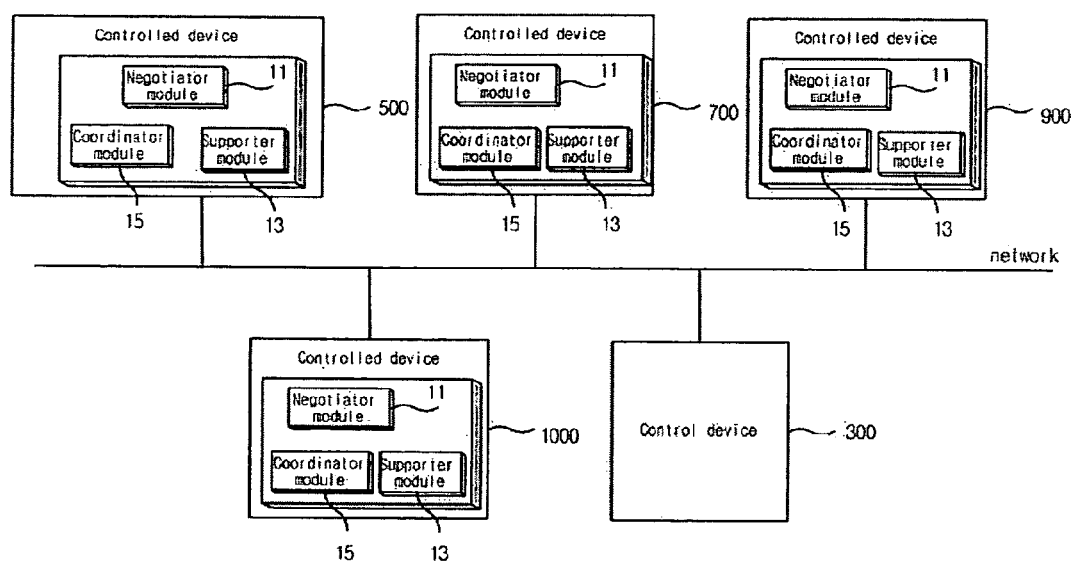

FIG. 15d illustrates the cooperative work service structure in which the service is performed through a plurality of the coordinator-supporter combos. In such a case, all the controlled devices 500, 700, 900 and 1000 that provide the same services on the network perform both the coordinator and supporter roles.

It can be used when there is no need for exclusive use of a specific service. The coordinator modules 15 in all the devices can control all the other supporter modules 13 to provide the service.

Even in such a case, the resources may be managed by the supporter modules 13.

Figure 15E:
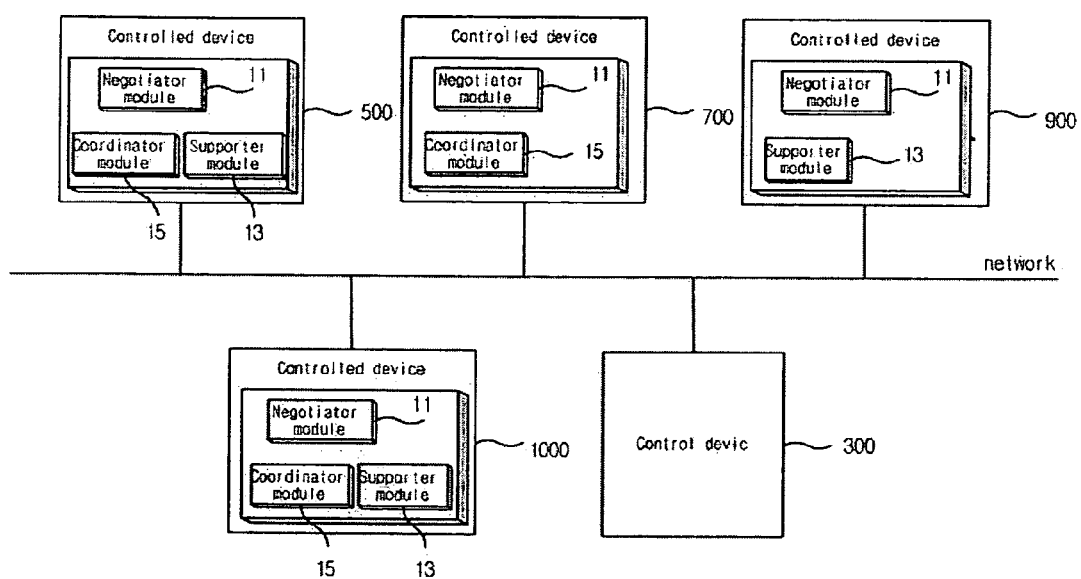

FIG. 15e illustrates the cooperative work service structure in which the service is performed through a plurality of coordinators and a plurality of supporters. This structure has the highest degree of freedom in which there are no limitations on a function of the participation service.

The structure shown in FIG. 15c can also provide the service in such a manner that the coordinator modules 15 of all the devices control all the supporter modules 13.

Figure 15F:
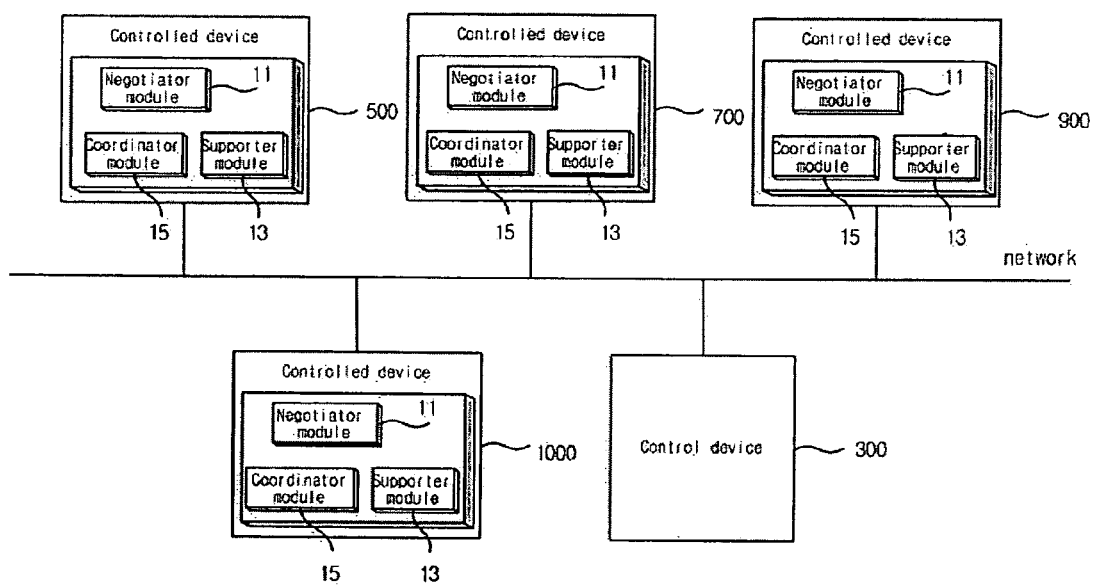

FIG. 15f illustrates the cooperative work service structure in which the service is performed through a plurality of independent coordinator-supporter combos. This structure provides the service in such a manner that all the devices 500, 700, 900 and 1000 that provide the same services on the network perform both the coordinator and supporter roles, similar to the control structure in which the plurality of coordinator-supporter combos are used.

In the structure shown in FIG. 15f, however, the coordinator module 15 of a device does not use the supporter modules 13 of the other devices and can control only the supporter module 13 of its own.

The cooperative work service platforms so constructed according to the present invention may be additionally provided in the conventional controlled devices that provide the predetermined services. The devices that provide the same services on the home network through the separately provided cooperative work service platforms (hereinafter, referred to as "auxiliary cooperative work service platforms") do not have a structure that can guarantee the consistency in the service itself, but can guarantee the service consistency through the added auxiliary cooperative work service platforms.

Figure 16:
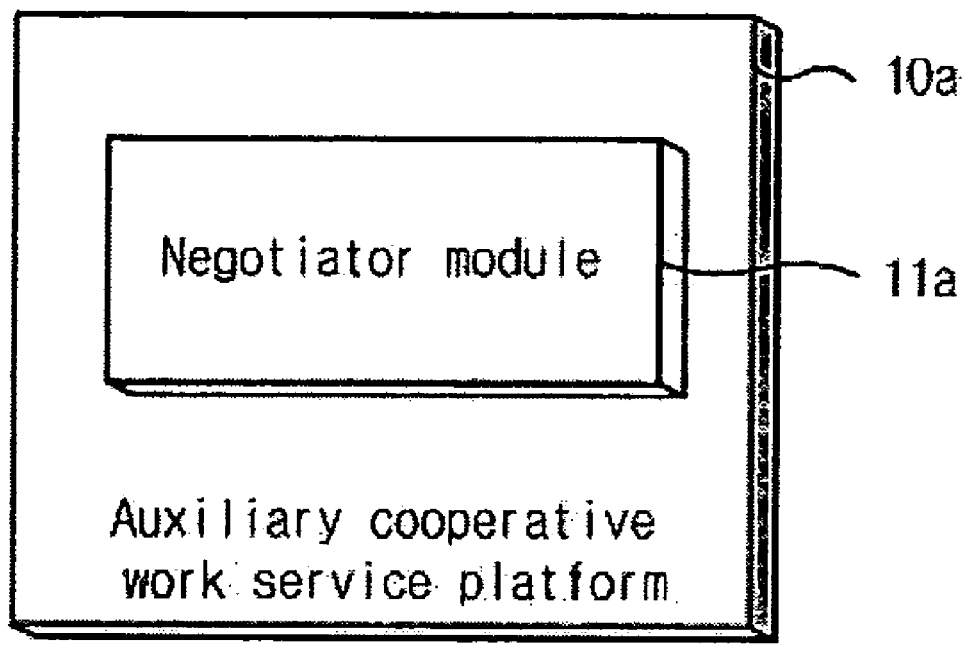
FIG. 16 is a diagram schematically illustrating the structure of an auxiliary cooperative work service platform according to another embodiment of the present invention.

FIG. 16 is a diagram schematically illustrating the structure of the auxiliary cooperative work service platform according to another embodiment of the present invention.

As shown in FIG. 16, the auxiliary cooperative work service platform 10a includes a negotiator module 11a for determining whether a service providing unit (hereinafter, referred to as "service platform") should be activated, which performs the service within a device to which it belongs according to the control command transmitted from the control device so that the cooperative work services can be made among devices by using the descriptions collected from the devices connected to the network.

The service is provided through the service platform of the relevant device in accordance with the determination made by the negotiator module 11a.

Hereinafter, the configuration and operation of the cooperative work service system using the auxiliary cooperative work service platform 10a according to the present invention will be described.

Figure 17:
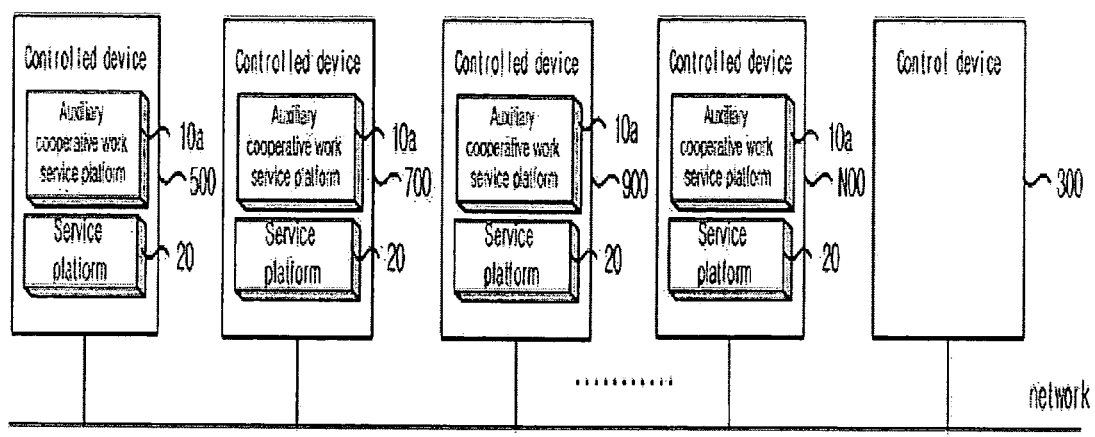
FIG. 17 is a diagram schematically illustrating the configuration of a home network system according to another embodiment of the present invention.

FIG. 17 is a diagram schematically illustrating the device control structure according to an embodiment of the present invention.

As shown in FIG. 17, the home network system includes a plurality of controlled devices 500, 700, 900, . . . , N00 connected to the network and a control device 300 for controlling the operations of the controlled devices 500, 700, 900, . . . , N00. Further, each of the controlled devices 500, 700, 900, . . . , N00 comprises an auxiliary cooperative work service platform 10a for determining whether the cooperative work service should be activated and controlling the operation of a service platform 20 according to the determination result so that consistency can be maintained among the same cooperative work services, and comprises the service platform 20 which is executed according to the control of the auxiliary cooperative work service platform 10a.

Figure 18:
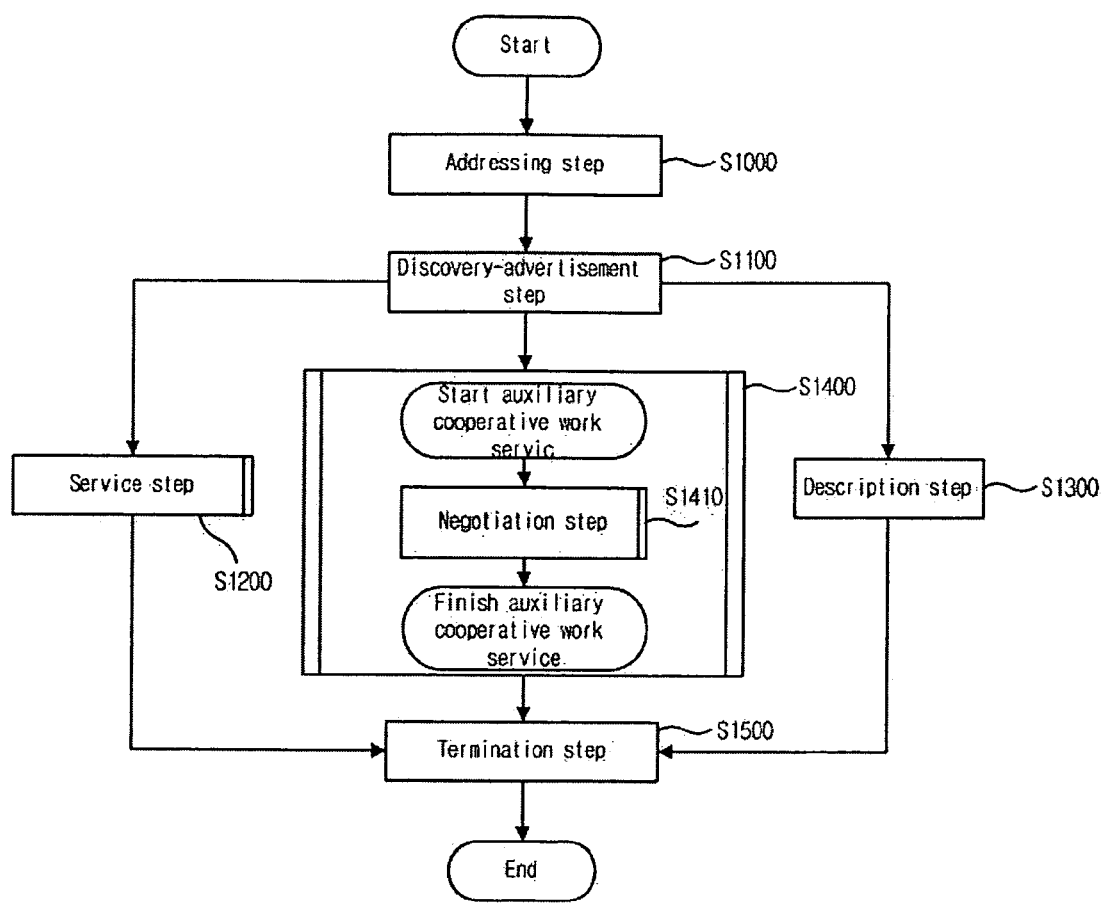
FIG. 18 is a flowchart illustrating a device control process according to another embodiment of the present invention.

FIG. 18 is a flowchart illustrating a device control process according to an embodiment of the present invention.

As shown in FIG. 18, the first device 500 newly connected to the network informs the control device 300 and the other controlled devices 700, 900, . . . , N00 of its presence, through addressing step S1000 and discovery advertisement step S1100.

Then, control step S1200 of controlling the operation in response to the control command transmitted from the control device 300 and description step S1300 of providing the descriptions requested by the control device 300 are performed.

In addition to steps S1200 and S1300, service devices for performing an auxiliary cooperative work service among the devices that provide the same services as that provided through the first device 500 added to the network, are determined so that cooperative work service step S1400 of providing the cooperative work service is performed.

The assistant cooperative work service step S1400 comprises the step S1410 of determining, through the negotiator module 11a, whether the service platform 20 should be activated. In negotiation step S1410, it is determined whether the service should be provided through the service platform of a device to which the negotiator module 11a belongs.

The negotiator module 11a causes the service platform 20 to be activated (or forked) or inactivated (or killed) according to the role determined through the negotiation step so as to control the operation of the auxiliary cooperative work service platform.

Figure 19A:
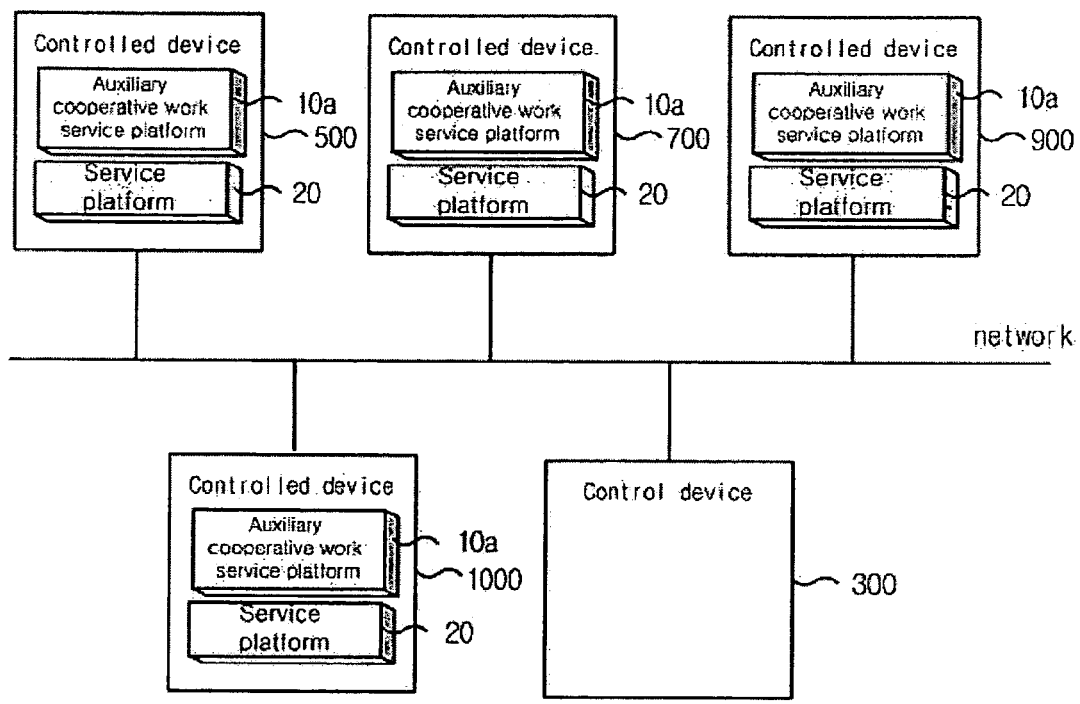
FIGS. 19a and 19b are diagrams schematically illustrating the device control structures for executing the auxiliary cooperative work services according to another embodiment of the present invention.
Figure 19B:
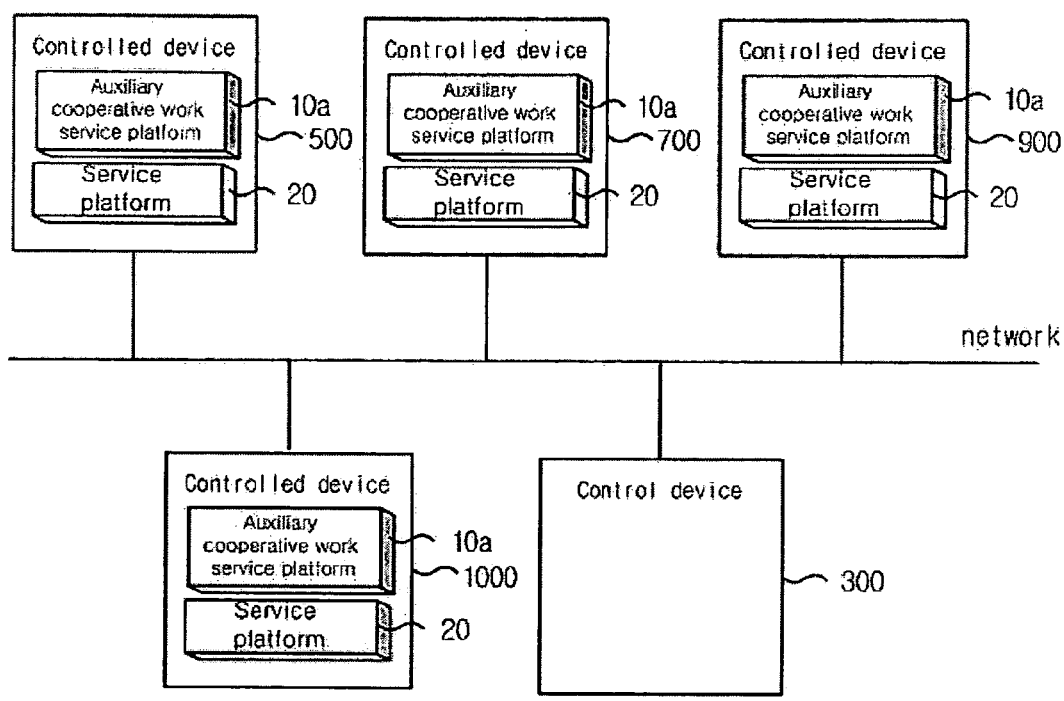

FIGS. 19a and 19b are diagrams schematically illustrating the device control structures for explaining the cooperative work service that is performed according to an embodiment of the present invention.

FIG. 19a shows the cooperative work service structure in which the service is provided through one service platform 20.

That is, it is first determined whether the service platforms 20 of the first, second, third and fourth device 500, 700, 900 and 1000 are activated. Then, if it is determined that the service should be provided through the service platform 20 of the fourth device 1000, the negotiator modules 11a of the first, second and third devices 500, 700 and 900 stop (or kill) the operations of the relevant service platforms 20 to be inactivated, whereas the negotiator module 11a of the fourth device 1000 causes the relevant service platform 20 to be operated (or forked) and thus to be activated.

FIG. 19b shows the cooperative work service structure in which the service is provided through the plurality of service platforms.

According to the present invention, an advantage can be obtained in that inconsistency among a plurality of the same services present in the home network can be obviated by using the services, device structures and operating methods of the present invention.

Further, the present invention has another advantage in that the services provided through the home network device can be efficiently defined, implemented and standardized by using the cooperative work service model of the present invention.

Furthermore, the present invention has a further advantage in that its system development resources can be reduced and service can be efficiently utilized since it can be implemented in combination with the existing home network environment.

Although the present invention has been described in connection with the embodiments of the present invention illustrated in the accompanying drawings, it is merely illustrative and is not limited thereto. Therefore, it will be understood by those skilled in the art that various changes and equivalents thereof can be made thereto without departing from the scope and spirit of the present invention defined by the claims. Accordingly, the true spirit and scope of the present invention should be construed as being defined by the appended claims.

What is claimed is:

1. A cooperative work service management apparatus comprising:
a negotiator module for determining cooperative work service roles of devices connected to a network, through a predetermined election algorithm, so that a cooperative work service can be performed among the devices by using descriptions collected from the devices, and controlling operations of the devices according to the determined cooperative work service roles to process a control command transmitted from a control device connected to the network,
wherein the cooperative work service comprises at least one function that is performed by at least two of the devices each of which is configured to individually perform the at least one function, and
wherein the at least two devices provide the same cooperative work service in the network,
wherein the same cooperative work service comprises same function that is allocated to be performed by the at least two of the devices, each of which is configured to individually perform said same function and not a supplemental portion of said same function, and
wherein the negotiator module comprises at least one hardware module.

2. The cooperative work service management apparatus as claimed in claim 1, wherein the negotiator module allocates the cooperative work service to the devices that perform at least one same function required for the cooperative work service.

3. The cooperative work service management apparatus as claimed in claim 1, wherein the negotiator module coordinates among the devices that provide same services using middleware service definitions for a home network.

4. A cooperative work service management apparatus, comprising:
a coordinator module for one of directly performing a control command transmitted from a control device present in a network having devices connected thereto and transmitting the control command to the devices so as to control operations of the devices performing at least one same function where the at least one same function is required for a cooperative work service, according to descriptions collected from the devices connected to the network and cooperative work service roles determined through a predetermined algorithm,
wherein the devices provide same cooperative work service in the network,
wherein the same cooperative work service comprises same function that is allocated to be performed by the at least two of the devices, each of which is configured to individually perform said same function and not a supplemental portion of said same function, and
wherein the coordinator module comprises at least one hardware module.

5. A cooperative work service management apparatus, comprising:
a supporter module for receiving a control command of a control device, transmitted from a coordinator module present in a network to provide a service corresponding to the control command, according to descriptions collected from devices connected to the network and cooperative work service roles determined through a predetermined algorithm,
wherein the devices perform at least one same function where the at least one same function is required for the service and wherein the predetermined algorithm allocates the service with the at least one same function amongst the devices to perform the at least one same function, and
wherein the devices provide same cooperative work service in the network,
wherein the same cooperative work service comprises same function that is allocated to be performed by the at least two of the devices, each of which is configured to individually perform said same function and not a supplemental portion of said same function, and
wherein the supporter module comprises at least one hardware module.

6. A cooperative work service management apparatus, comprising:
a negotiator module for determining cooperative work service roles of devices connected to a network through a predetermined election algorithm so that a cooperative work service can be performed among the devices by using descriptions collected from the devices; and
a coordinator module for one of directly performing a control command transmitted from a control device present in the network and transmitting the control command to the devices, so as to control the operations of the devices,
wherein the devices provide same cooperative work service in the network,
wherein the same cooperative work service comprises same function that is allocated to be performed by the at least two of the devices, each of which is configured to individually perform said same function and not a supplemental portion of said same function, and
wherein the negotiator module comprises at least one hardware module.

7. The cooperative work service management apparatus as claimed in claim 6, further comprising a supporter module for receiving the control command transmitted from the coordinator module to provide a service corresponding to the control command.

8. The cooperative work service management apparatus as claimed in claim 6, wherein if the cooperative work service roles are determined through the election algorithm, the negotiator module sets the determined cooperative work service roles into a description of a relevant device so that the cooperative work service can be performed among the devices.

9. The cooperative work service management apparatus as claimed in claim 8, wherein the negotiator modules sets the determined cooperative work service roles by activating one of the coordinator module or a support module which receives the control command transmitted from the coordinator module to provide a service corresponding to the control command and deactivating the other module.

10. The cooperative work service management apparatus as claimed in claim 6, wherein the election algorithm is written in a predetermined programming language, which serves to coordinate the cooperative work service roles of the devices so that consistency in the same services can be maintained according to a function of service to be provided through the cooperative work service by using the descriptions provided from the devices present in the network.

11. A home network apparatus for cooperative work service, wherein the home network apparatus is connected to a cooperative work service management apparatus which comprises:
 a negotiator module for determining cooperative work service roles of devices connected to a network through a predetermined election algorithm so that a cooperative work service can be performed among the devices by using descriptions collected from the devices, and a coordinator module for one of directly performing a control command transmitted from a control device present in the network and transmitting the control command to the devices, so as to control the operations of the devices,
 wherein the cooperative work service comprises at least one function that is performed by at least two of the devices each of which is configured to individually perform the at least one function, and
 wherein the devices provide same cooperative work service in the network,
 wherein the same cooperative work service comprises same function that is allocated to be performed by the at least two of the devices, each of which is configured to individually perform said same function and not a supplemental portion of said same function, and
 wherein the negotiator module comprises at least one hardware module.

12. The home network apparatus as claimed in claim 11, further comprising a supporter module for receiving the control command transmitted from the coordinator module in order to provide a service corresponding to the received control command.

13. The home network apparatus as claimed in claim 11, wherein if the cooperative work service roles are determined through the election algorithm, the negotiator module sets the determined cooperative work service roles into a device description of a relevant device so that the cooperative work service can be performed among the devices.

14. The home network apparatus as claimed in claim 11, wherein the election algorithm is written in a predetermined programming language, which serves to coordinate the cooperative work service roles of the devices so that consistency in same services can be maintained according to a function of a service to be provided through the cooperative work service by using the descriptions provided from the devices present in the network.

15. A home network system for cooperative work service, comprising:
 a plurality of devices connected to a network;
 a negotiator module connected to the plurality of devices, for determining cooperative work service roles of the plurality of devices by applying device descriptions collected from the plurality of devices to a predetermined election algorithm so that the cooperative work service can be performed in consideration of a function of a corresponding device; and
 a coordinator module for directly performing a control command transmitted from a control device according to the cooperative work service roles determined by the negotiator module,
 wherein the plurality of devices provide same cooperative work service in the network, and
 wherein the same cooperative work service comprises same function that is allocated to be performed by the at least two of the devices, each of which is configured to individually perform said same function and not a supplemental portion of said same function.

16. The home network system as claimed in claim 15, further comprising a supporter module for performing the operations of the plurality of devices according to the cooperative work service roles determined by the negotiator module,
 wherein the coordinator module transmits a control command to the supporter module and causes the supporter module to process the control command.

17. The home network system as claimed in claim 15, further comprising a supporter module, wherein the supporter module is provided in a device, to which the supporter module belongs, among the plurality of devices connected to the network.

18. The home network system as claimed in claim 15, further comprising a supporter module, wherein the supporter module is provided in a device, to which the supporter module does not belong, among the plurality of devices connected to the network.

19. The home network system as claimed in claim 15, wherein if the cooperative work service roles are determined through the election algorithm, the negotiator module sets the determined cooperative work service roles into the description of a relevant device so that the cooperative work service can be performed among the plurality of devices.

20. The home network system as claimed in claim 15, wherein the election algorithm is written in a predetermined programming language, which serves to coordinate the cooperative work service roles of the plurality of devices so that consistency in same services can be maintained according to a function of a service to be provided through the cooperative work service by using the descriptions provided from the plurality of devices present in the network.

21. The home network system as claimed in claim 15, wherein the negotiator module is dedicated to determining cooperative work services roles and is in a separate apparatus from the plurality of devices.

22. A non-transitory recordable storage medium, comprising:
 a negotiator module for determining cooperative work service roles of devices connected to a network through a predetermined election algorithm so that a cooperative work service among the devices can be performed by using descriptions collected from the devices;
 a supporter module for performing operations of the devices according to the cooperative work service roles determined by the negotiator module; and a coordinator module for one of directly performing a control command transmitted from a control device and transmitting the control command to the supporter module to process the control command, wherein the devices provide same cooperative work service in the network, and wherein the same cooperative work service comprises same function that is allocated to be performed by the at least two of the devices, each of which is configured to individually perform said same function and not a supplemental portion of said same function.

23. The non-transitory recordable storage medium as claimed in claim 22, wherein if the cooperative work service roles are determined through the election algorithm, the negotiator module sets the determined cooperative work service roles into a description of a relevant device so that the cooperative work service can be performed among the devices.

24. The non-transitory recordable storage medium as claimed in claim 22, wherein the election algorithm is written in a predetermined programming language, which serves to coordinate the cooperative work service roles of the devices so that consistency in same services can be maintained according to a function of a service to be provided through the cooperative work service by using the descriptions provided from the devices present in the network.

25. The non-transitory recordable storage medium as claimed in claim 22, wherein if the supporter module is activated in a device, the coordinator module is deactivated in the device and vice versa.

26. A cooperative work service method, comprising:
causing a cooperative work service to inform other cooperative work services connected to a network having a plurality of devices of a presence of said cooperative work service and to exchange service descriptions with cooperative work services having the same service functions;
determining a role of the cooperative work service by using the provided service descriptions and a predetermined election algorithm; and
selectively executing one of a coordinator module and a supporter module according to the determined role,
wherein the plurality of devices provide same cooperative work service in the network, and
wherein the same cooperative work service comprises same function that is allocated to be performed by the at least two of the devices, each of which is configured to individually perform said same function and not a supplemental portion of said same function.

27. The cooperative work service method as claimed in claim 26, further comprising:
causing the coordinator module to request the supporter module connected to the network for a service according to a control command sent by a control device and to receive a response from the supporter module; and
causing the supporter module to inform the coordinator module connected to the network of an event message generated according to the control command and to receive a response from the coordinator module.

28. The cooperative work service method as claimed in claim 26, wherein the election algorithm is written in a predetermined programming language, which serves to coordinate cooperative work service roles of devices so that consistency in the same services can be maintained according to a function of a service to be provided through the cooperative work service by using device descriptions provided from the devices present in the network.

29. The cooperative work service method as claimed in claim 28, wherein a process of coordinating the cooperative work service roles of the devices comprises:
determining, through a discovery-advertisement process for informing other devices present in the network of the presence of each device, whether other cooperative work services exist;
determining a cooperative work service role of each device as a coordinator if it is determined that there are no said other cooperative work services; and
collecting the service descriptions from the same cooperative work services and determining whether the cooperative work service role of said each device was a coordinator if it is determined that there are said other cooperative work services, and then, establishing the cooperative work service role as the coordinator if the cooperative work service role was a coordinator, and establishing the cooperative work service role as a supporter if the cooperative work service role was not a coordinator.

30. The cooperative work service method as claimed in claim 29, wherein if the coordinator is a device which performs same service as another device exists, the another device is a supporter which executes one of processing a control command transmitted from the coordinator device and resides on the network providing services corresponding to the control command provided by the coordinator device.

31. The cooperative work service method as claimed in claim 28, wherein the determined cooperative work service role is a coordinator for one of directly receiving and performing a control command transmitted from a control device present in the network, and transmitting a control command to other devices, to control the operations of the devices.

32. The cooperative work service method as claimed in claim 28, wherein the determined cooperative work service role is a supporter for one of processing a control command transmitted from a device which performs the coordinator role and resides on the network and providing services corresponding to the control command.

33. A cooperative work service management apparatus, comprising:
a negotiator module for determining whether a service providing unit, which performs a specific service within a device, to which the negotiator module belongs, according to a control command obtained by using a predetermined election algorithm transmitted from a control device, should be activated, so that a cooperative work service among devices can be performed by using descriptions collected from the devices connected to a network,
wherein the devices provide same cooperative work service in the network,
wherein the same cooperative work service comprises same function that is allocated to be performed by the at least two of the devices, each of which is configured to individually perform said same function and not a supplemental portion of said same function, and
wherein the negotiator module comprises at least one hardware module.

34. A home network apparatus, comprising:
a service providing unit connected to a network for providing a predetermined service; and
a negotiator module for determining whether the service providing unit within a device to which the negotiator module belongs should be activated according to a predetermined election algorithm, so that a cooperative work service among devices, performing at least one same function where the at least one same function is required for the cooperative work service, can be performed through device descriptions collected from the devices connected to the network, wherein the devices provide same cooperative work service in the network, wherein the same cooperative work service comprises same function that is allocated to be performed by the at least two of the devices, each of which is configured to individually perform said same function and not a supplemental portion of said same function, and wherein the negotiator module comprises at least one hardware module.

35. A home network system, comprising:

a plurality of devices connected to a network;

a service providing unit connected to each of the plurality of devices, for providing a predetermined service; and a negotiator module for determining whether the service providing unit within a device to which the negotiator module belongs should be activated according to a predetermined election algorithm, so that a cooperative work service among the plurality of devices, performing at least one same function where the at least one same function is required for the cooperative work service, can be performed through device descriptions collected from the plurality of devices connected to the network, wherein the plurality of devices provide same cooperative work service in the network, and wherein the same cooperative work service comprises same function that is allocated to be performed by the at least two of the devices, each of which is configured to individually perform said same function and not a supplemental portion of said same function.

36. A cooperative work service method, comprising:

causing a cooperative work service to inform other cooperative work services connected to a network having a plurality of devices of a presence of said cooperative work service and to exchange service descriptions with at least one of the other cooperative work services having the same service functions;

determining a role of the cooperative work service by using the provided service descriptions and a predetermined election algorithm; and one of executing and terminating a relevant service according to the determined role, wherein the plurality of devices provide same cooperative work service in the network, and wherein the same cooperative work service comprises same function that is allocated to be performed by the at least two of the devices, each of which is configured to individually perform said same function and not a supplemental portion of said same function.

* * * * *